US010823029B2

(12) United States Patent
Chen et al.

(10) Patent No.: US 10,823,029 B2
(45) Date of Patent: Nov. 3, 2020

(54) DETERMINING FIRING DENSITY OF A SKIP FIRE CONTROLLED LEAN-BURN ENGINE USING AIR-FUEL RATIO AND EXHAUST TEMPERATURES

(71) Applicant: Tula Technology, Inc., San Jose, CA (US)

(72) Inventors: Shikui Kevin Chen, San Jose, CA (US); Matthew A. Younkins, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 16/373,364

(22) Filed: Apr. 2, 2019

(65) Prior Publication Data

US 2019/0226378 A1 Jul. 25, 2019

Related U.S. Application Data

(63) Continuation-in-part of application No. 16/275,881, filed on Feb. 14, 2019, now Pat. No. 10,494,971, (Continued)

(51) Int. Cl.
*F01N 3/08* (2006.01)
*F01N 3/20* (2006.01)
(Continued)

(52) U.S. Cl.
CPC ........... *F01N 3/2033* (2013.01); *F01N 3/021* (2013.01); *F01N 3/0814* (2013.01);
(Continued)

(58) Field of Classification Search
CPC ...... F01N 11/005; F01N 13/009; F01N 3/021; F01N 3/0814; F01N 3/2033;
(Continued)

(56) References Cited

U.S. PATENT DOCUMENTS 4,434,767 A 3/1984 Kohama et al.
4,489,695 A 12/1984 Kohama et al.
(Continued)

FOREIGN PATENT DOCUMENTS

WO WO2007/100438 9/2007
WO WO 2010/006311 1/2010
WO WO 2011/085383 7/2011

OTHER PUBLICATIONS

International Search Report dated Feb. 23, 2017 from International Application No. PCT/US2016/061139.
(Continued)

*Primary Examiner* — Matthew T Largi
(74) *Attorney, Agent, or Firm* — Beyer Law Group LLP

(57) ABSTRACT

A skip fire control that relies on a combination of a torque request, exhaust temperature, and air-fuel ratio in determining firing density is described. Also, skipped firing opportunities may either pump or not pump air into an exhaust system, allowing an exhaust gas temperature in the exhaust system to be controlled or modulated. The present invention is also related to Dynamic Skip Fire (DSF), where a decision to either fire or skip cylinders is made every firing opportunity.

41 Claims, 12 Drawing Sheets

Related U.S. Application Data which is a continuation of application No. 15/347,562, filed on Nov. 9, 2016, now Pat. No. 10,247,072.

(60) Provisional application No. 62/254,049, filed on Nov. 11, 2015.

(51) Int. Cl.

| | |
|---|---|
| *F02D 41/00* | (2006.01) |
| *F01N 11/00* | (2006.01) |
| *F01N 3/021* | (2006.01) |
| *F02D 41/40* | (2006.01) |
| *F01N 13/00* | (2010.01) |
| *F02D 41/14* | (2006.01) |
| *F02D 13/06* | (2006.01) |
| *F02D 41/02* | (2006.01) |

(52) U.S. Cl.
CPC .......... *F01N 3/2066* (2013.01); *F01N 11/005* (2013.01); *F01N 13/009* (2014.06); *F02D 41/005* (2013.01); *F02D 41/0007* (2013.01); *F02D 41/0087* (2013.01); *F02D 41/401* (2013.01); *F01N 2430/08* (2013.01); *F01N 2900/08* (2013.01); *F01N 2900/1404* (2013.01); *F01N 2900/1602* (2013.01); *F02D 13/06* (2013.01); *F02D 41/029* (2013.01); *F02D 41/1446* (2013.01); *F02D 2041/0012* (2013.01); *F02D 2200/0802* (2013.01); *F02D 2200/0804* (2013.01); *F02D 2250/18* (2013.01); *F02D 2250/21* (2013.01); *Y02T 10/12* (2013.01); *Y02T 10/40* (2013.01)

(58) Field of Classification Search
CPC .............. F01N 3/2066; F01N 2430/08; F01N 2900/08; F01N 2900/1404; F01N 2900/1602; F02D 41/0087; F02D 41/401; F02D 2041/0012; F02D 2200/0802; F02D 2200/0804
See application file for complete search history.

(56) References Cited

U.S. PATENT DOCUMENTS

| | | | |
|---|---|---|---|
| 4,509,488 A | 4/1985 | Forster et al. | |
| 4,552,114 A | 11/1985 | Sano et al. | |
| 5,377,631 A | 1/1995 | Schechter | |
| 5,410,876 A | 5/1995 | Simko | |
| 5,483,941 A | 1/1996 | Cullen et al. | |
| 5,553,575 A | 9/1996 | Beck et al. | |
| 5,768,887 A | 6/1998 | Nakamura et al. | |
| 5,826,563 A | 10/1998 | Patel et al. | |
| 5,945,597 A | 8/1999 | Poublan et al. | |
| 6,158,411 A | 12/2000 | Morikawa | |
| 6,257,207 B1 | 7/2001 | Inui et al. | |
| 6,273,076 B1 | 8/2001 | Beck et al. | |
| 6,314,735 B1 | 11/2001 | Kolmanovsky et al. | |
| 6,405,705 B1 | 6/2002 | Dunsworth | |
| 6,415,601 B1 | 7/2002 | Glugla et al. | |
| 6,619,258 B2 | 9/2003 | McKay et al. | |
| 6,732,506 B2 | 5/2004 | Patterson et al. | |
| 6,769,398 B2 | 8/2004 | Surnilla et al. | |
| 6,978,204 B2 | 12/2005 | Surnilla et al. | |
| 7,032,572 B2 | 4/2006 | Bidner et al. | |
| 7,032,581 B2 | 4/2006 | Gibson et al. | |
| 7,063,062 B2 | 6/2006 | Lewis et al. | |
| 7,066,136 B2 | 6/2006 | Ogiso et al. | |
| 7,069,903 B2 | 7/2006 | Surnilla et al. | |
| 7,069,910 B2 | 7/2006 | Surnilla et al. | |
| 7,086,386 B2 | 8/2006 | Doering | |
| 7,124,717 B2 | 10/2006 | Gaessler et al. | |
| 7,165,391 B2 * | 1/2007 | Lewis ................ | F02D 13/06 123/90.15 |
| 7,165,520 B2 | 1/2007 | Lewis et al. | |
| 7,503,312 B2 | 3/2009 | Surnilla et al. | |
| 7,854,114 B2 | 12/2010 | England | |
| 7,930,087 B2 | 4/2011 | Gibson et al. | |
| 7,931,002 B1 | 4/2011 | Gibson et al. | |
| 8,099,224 B2 | 1/2012 | Tripathi et al. | |
| 8,131,445 B2 * | 3/2012 | Tripathi .............. | F02D 41/0087 701/102 |
| 8,225,771 B2 | 7/2012 | Aso et al. | |
| 8,689,541 B2 | 4/2014 | McDonald et al. | |
| 8,886,422 B2 | 11/2014 | Sujan et al. | |
| 8,892,330 B2 | 11/2014 | Yuille et al. | |
| 8,931,255 B2 | 1/2015 | Wilson | |
| 9,086,020 B2 | 7/2015 | Pirjaberi et al. | |
| 9,267,454 B2 | 2/2016 | Wilcutts et al. | |
| 9,399,964 B2 | 7/2016 | Younkins et al. | |
| 9,664,130 B2 | 5/2017 | Wilcutts et al. | |
| 9,726,094 B2 | 8/2017 | Younkins et al. | |
| 9,964,051 B2 | 5/2018 | Pirjaberi et al. | |
| 10,161,325 B2 | 12/2018 | Zur Loye et al. | |
| 2002/0073696 A1 | 6/2002 | Kuenstler et al. | |
| 2002/0116917 A1 | 8/2002 | Glugla et al. | |
| 2003/0010016 A1 | 1/2003 | Beer et al. | |
| 2003/0121249 A1 * | 7/2003 | Foster ................ | F02D 41/0087 60/285 |
| 2003/0187565 A1 | 10/2003 | Wong et al. | |
| 2003/0221655 A1 | 12/2003 | Surnilla et al. | |
| 2004/0118116 A1 | 6/2004 | Beck et al. | |
| 2004/0206071 A1 | 10/2004 | Glugla et al. | |
| 2004/0237514 A1 | 12/2004 | Surnilla et al. | |
| 2004/0255576 A1 | 12/2004 | Brown et al. | |
| 2006/0130459 A1 | 6/2006 | Warner et al. | |
| 2007/0051092 A1 | 3/2007 | Pallett et al. | |
| 2007/0051350 A1 | 3/2007 | Pallet et al. | |
| 2009/0301060 A1 | 12/2009 | Kennie et al. | |
| 2010/0006065 A1 | 1/2010 | Tripathi et al. | |
| 2010/0047792 A1 | 2/2010 | Szendro et al. | |
| 2010/0050993 A1 | 3/2010 | Zhao et al. | |
| 2010/0186384 A1 | 7/2010 | Gonze et al. | |
| 2011/0048372 A1 | 3/2011 | Dibble et al. | |
| 2011/0197860 A1 | 8/2011 | Aso et al. | |
| 2011/0253113 A1 | 10/2011 | Roth et al. | |
| 2011/0295489 A1 | 12/2011 | Ma et al. | |
| 2012/0042633 A1 | 2/2012 | Silvestri et al. | |
| 2012/0046853 A1 | 2/2012 | Silvestri et al. | |
| 2012/0102920 A1 * | 5/2012 | Pipis, Jr. ............ | F02D 17/02 60/274 |
| 2012/0204827 A1 | 8/2012 | Sieber et al. | |
| 2013/0255626 A1 | 10/2013 | Serrano | |
| 2014/0041625 A1 | 2/2014 | Pirjaberi et al. | |
| 2016/0115878 A1 | 4/2016 | VanDerWege | |
| 2016/0186672 A1 | 6/2016 | Mehrotra et al. | |
| 2017/0074185 A1 | 3/2017 | Reynolds et al. | |
| 2017/0130630 A1 | 5/2017 | Younkins et al. | |
| 2017/0159581 A1 | 6/2017 | McCarthy, Jr. et al. | |
| 2017/0342920 A1 | 11/2017 | Pirjaberi et al. | |
| 2017/0342922 A1 | 11/2017 | Pirjaberi et al. | |
| 2017/0370308 A1 | 12/2017 | Hashemi et al. | |
| 2018/0179973 A1 | 6/2018 | Tsuruoka | |
| 2020/0025050 A1 | 1/2020 | Chen et al. | |

OTHER PUBLICATIONS

Written Opinion dated Feb. 23, 2017 from International Application No. PCT/US2016/061139.
International Preliminary Report on Patentability dated May 24, 2018 from International Application No. PCT/US2016/061139.
Younkins et al., U.S. Appl. No. 16/275,881, filed Feb. 14, 2019.
International Search Report and Written Opinion dated Jul. 14, 2020 from International Application No. PCT/US 20/18313.

* cited by examiner

DETERMINING FIRING DENSITY OF A SKIP FIRE CONTROLLED LEAN-BURN ENGINE USING AIR-FUEL RATIO AND EXHAUST TEMPERATURES

CROSS REFERENCE TO RELATED APPLICATIONS

This application is a Continuation-in-Part of U.S. application Ser. No. 16/275,881, filed Feb. 14, 2019, which is a Continuation of U.S. application Ser. No. 15/347,562 (now U.S. Pat. No. 10,247,072, issued Apr. 2, 2019), filed on Nov. 9, 2016, which claims priority to U.S. Provisional Application No. 62/254,049, filed on Nov. 11, 2015. All the above listed applications are incorporated by reference herein in their entirety for all purposes.

FIELD OF THE INVENTION

The present invention relates to a skip fire engine control system for a lean burn internal combustion engine, and more specifically, to skip fire engine control where an air-fuel ratio is maintained within a range to minimize undesirable pollutants in the exhaust stream of the lean burn internal combustion engine.

BACKGROUND

Most vehicles in operation today are powered by internal combustion (IC) engines. Internal combustion engines typically have multiple working chambers (i.e., cylinders) where combustion occurs. The power generated by the engine depends on a combination of (a) the number of cylinders and (b) the amount of fuel and air that is delivered to each cylinder. During everyday driving, the engine of a vehicle typically operates over a wide range of torque demands and operating speeds to meet varying driving conditions.

There are two basic types of IC engines; spark ignition (SI) engines and compression ignition engines. Both engine types typically use a cylinder as the working chamber with a piston that reciprocates within the cylinder forming an enclosed volume with variable size depending on the piston location. Air is inducted from an intake manifold into one or more cylinders thru an intake valve or valves by forcing the piston to expand the enclosed volume. The inducted air is then compressed by the piston moving so as to contract the enclosed volume. Combustion occurs within a contained volume of the cylinder at or near its minimum size. Expanding combustion gases push the piston outward expanding the enclosed volume and performing useful work. The piston in turn forces out exhaust gases from the enclosed volume into an exhaust manifold thru one or more exhaust valve(s).

With SI engines, combustion is initiated by a spark. That is, an air-fuel mixture is contained within the cylinder(s) of an engine and then a spark, typically from a spark-plug, is used to ignite the mixture.

Compression engines, on the other hand, rely on pressure and temperature of the air-fuel mixture, not a spark, to initiate combustion. An air-fuel mixture is contained within the cylinder and combustion is caused by elevation of the mixture temperature by mechanical compression, resulting in spontaneous combustion of the fuel.

The air-fuel ratio in a cylinder is an important measure with both SI and compression-ignition type engines. If exactly enough air is provided to completely burn all the fuel without any remaining oxygen, the ratio is known as "stoichiometric".

Ratios lower than stoichiometric are considered "rich", meaning the ratio defines more fuel than can be burned by the provided amount of air. Rich mixtures tend to generate more power and burn cooler, but at the expense of efficiency.

Ratios higher than stoichiometric, on the other hand, are considered "lean", meaning the ratio defines more air than fuel. Lean mixtures are typically more efficient but may cause higher temperatures that can lead to the generation of nitrogen oxides.

Spark ignition engines are generally operated with a stoichiometric fuel/air ratio and have their output torque controlled by controlling the mass air charge (MAC) in a cylinder. Mass air charge is generally controlled using a throttle to reduce the intake manifold absolute pressure (MAP).

Compression ignition engines typically control the engine output by controlling the amount of fuel injected (hence changing the air/fuel ratio), not air flow through the engine. Engine output torque is reduced by adding less fuel to the air entering the cylinder (i.e. running the engine leaner). Compression ignition engines generally run with a lean air/fuel ratio. For example, a Diesel engine, which is the most common type of compression-ignition engine, may typically operate with air/fuel ratios with a range of 16 to 55 compared to a stoichiometric air/fuel ratio of approximately 14.6. Some, usually older, Diesel engines generally do not use a throttle, but instead use a turbocharger to control air flow into the engine. Compression ignition engines may also be further classified based on their fuel and how the fuel is mixed with air within the cylinder. Several common types of compression ignition engines include a stratified charge compression ignition engine (e.g., most conventional Diesel engines, and abbreviated as SCCI), a premixed charge compression ignition (PCCI) engine, a reactivity-controlled compression ignition (RCCI) engine, a gasoline compression ignition engines (GCI) engine, and a homogeneous charge compression ignition (HCCI) engine.

Both spark ignition and compression ignition engines require emission control systems including one or more aftertreatment elements to limit emissions of undesirable pollutants that are combustion byproducts.

Spark ignition engines generally use a 3-way catalyst that both oxidizes unburned hydrocarbons and carbon monoxide and reduces nitrous oxides ($NO_x$). These catalysts require that on average the engine combustion be at or near the stoichiometric air/fuel ratio, so that both oxidation and reduction reactions can occur.

Since compression ignition engines generally run lean, they cannot rely on a conventional 3-way catalyst to meet emissions regulations. Instead they use another type of aftertreatment device to reduce $NO_x$ emissions. These aftertreatment devices may use catalysts, lean $NO_x$ traps, and selective catalyst reduction (SCR) to reduce nitrous oxides to molecular nitrogen. Additionally, Diesel engines often require a particulate filter to reduce soot emissions.

Fuel efficiency of internal combustion engines can be substantially improved by varying the engine displacement. This allows for the full torque to be available when required, yet can significantly reduce pumping losses and improve thermal efficiency by using a smaller displacement when full torque is not required.

The most common method today of implementing a variable displacement engine is to deactivate a group of cylinders substantially simultaneously. Commercially available variable displacement engines available today typically support only two or at most three displacements.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then skipped during the next engine cycle and selectively skipped or fired during the next. From an engine cycle perspective, skip fire control may have different sets of cylinders fired during sequential engine cycles to generate the same average torque, whereas variable displacement operation deactivates the same set of cylinders. In this manner, even finer control of the effective engine displacement is possible. For example, firing every third cylinder in a 4-cylinder engine would provide an effective reduction to $\frac{1}{3}^{rd}$ of the full engine displacement, which is a fractional displacement that is not obtainable by simply deactivating a set of cylinders to create an even firing pattern.

With skip fire engine control, selecting the correct firing patterns or firing density is a challenge. If a firing density is selected that is too aggressive, meaning fewer firings for a given torque request, while efficiency may be improved, the vehicle may be subject to unacceptable levels of Noise, Vibration and Harshness (NVH). On the other hand, if the firing density is overly high, then operational efficiency of the engine may be lost. Also, for compression ignition engines pollutants in the engine's exhaust stream are dependent on the air/fuel ratio.

More sophisticated methods for deriving an optimal firing density, which provide high levels of engine efficiency, acceptable levels of NVH, and low levels of exhaust stream pollutants, is therefore needed.

SUMMARY OF THE INVENTION

The present invention relates to skip fire control for determining a firing density (FD) for an internal combustion engine using a combination of:

(a) The temperature of exhaust gases exhausted from the internal combustion engine;

(b) The air-fuel ratio of the air-fuel mixture introduced into one or more of the cylinders of the internal combustion engine; and (c) A torque request.

By using all three inputs, a FD can be defined that best optimizes or balances a number of vehicle operating parameters, including (1) the engine output to meet the current torque request, (2) acceptable levels of NVH and (3) fuel efficiency. In addition, (4) the air-fuel ratio and (5) exhaust gas temperatures can each be modulation within predefined ranges, both of which have the effect of reducing the burden on aftertreatment elements to improve tailpipe emissions.

In a non-exclusive embodiment, the predefined range of the air-fuel ratio is between 20 and 35. The air-fuel ratio is maintained within the predefined range by adjusting or controlling one or more engine operational parameters selected from a group including firing density, boost level, exhaust gas recirculation level, intake valve lift profile, exhaust valve lift profile, and/or the inducted air mass in the cylinder(s). In yet other embodiments, the predefined range can have a lower threshold that is less than 20 and/or a higher threshold that is more than 35.

The skip fire controller modulates the temperature of the exhaust gases passing through the aftertreatment system by controlling pumping air through the engine and firing density. By pumping air through at least one skipped cylinder, the temperature of the exhaust gases passing through the aftertreatment system can be reduced. Alternatively, by closing the intake and/or the exhaust valve(s) of cylinder(s), the lack of pumped air acts to prevent the temperature of the exhaust gases passing through the aftertreatment system from decreasing. By controlling skipped cylinders to either pump or prevent pumping, the temperature of the exhaust gases in the aftertreatment system can be modulated. Reducing the firing density increases the cylinder load, which increases the exhaust gas temperature. Similarly, increasing the firing density decreases the cylinder load, which decreases the exhaust gas temperature.

In yet another embodiment, the skip fire controller may implement a priority scheme for defining firing densities and deactivating cylinders. When either the pressure in the turbocharger is too high or the exhaust gas temperature is outside of its normal operating range, the defined firing densities and/or cylinder pumping can be prioritized to modulate and/or adjust the pressure and/or temperature to within normal operating ranges. When within the normal ranges, the firing density is optimized for meeting current torque demands with acceptable levels of NVH.

In yet other embodiments, the internal combustion engine is a compression-ignition engine, a spark ignition engine, a lean-burn engine, a Diesel engine or a gasoline engine.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1A:
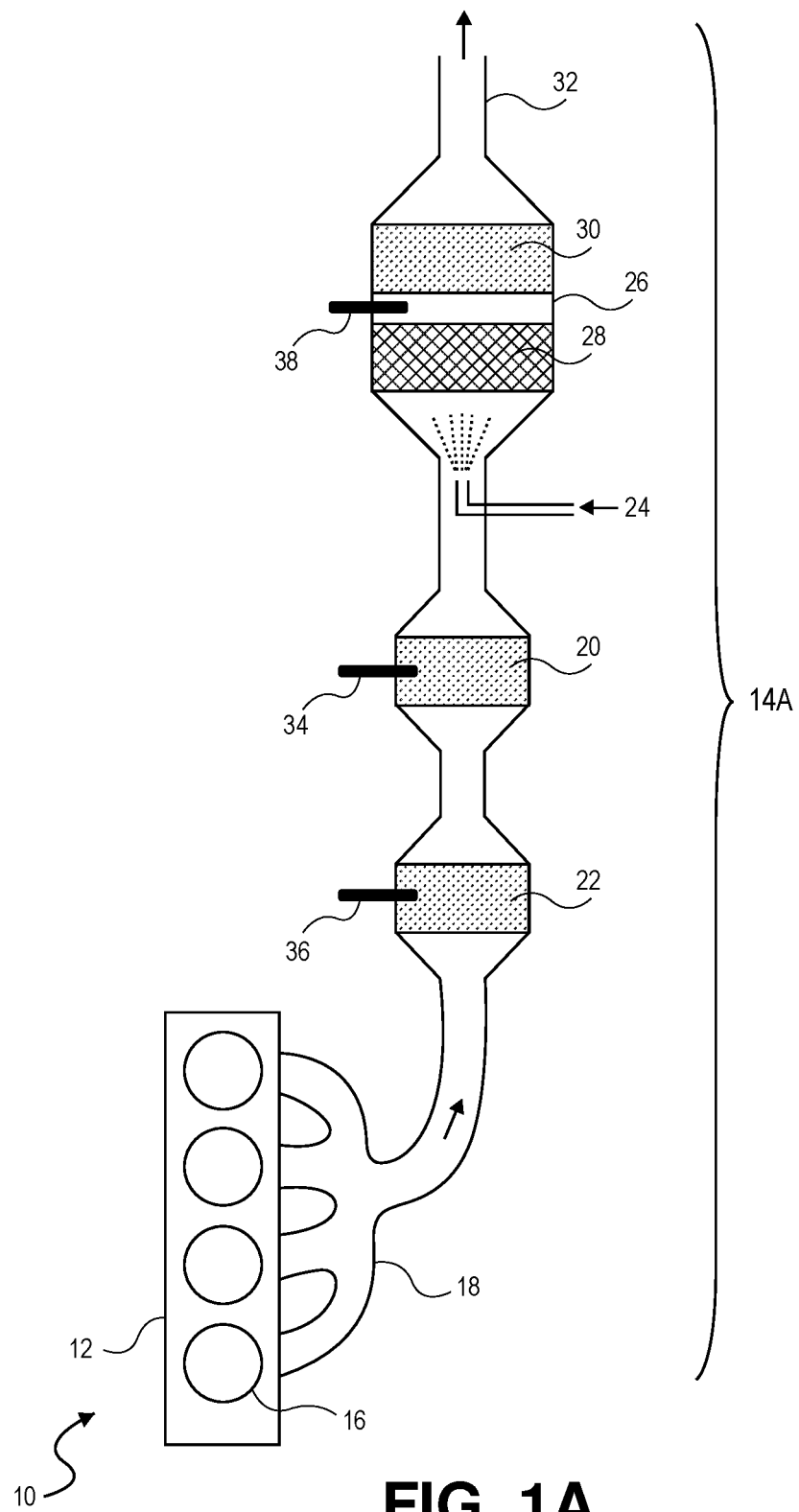
FIG. 1A is a schematic diagram of a representative engine exhaust system for an exemplary compression ignition engine.

The present invention relates to skip fire control that relies on a combination of a torque request, an exhaust temperature, an NVH level, and an air-fuel ratio in determining a firing density (FD) of an internal combustion engine. The internal combustion engine may be a lean burn engine and may be used to power a vehicle. In addition, the present invention also is directed to using different types of working chamber valve control during skipped firing opportunities that either allow or prevent pumping air through the engine to control and modulate exhaust gas temperature in aftertreatment systems.

Skip Fire Engine Control

Skip fire engine control contemplates selectively skipping the firing of certain cylinders during selected firing opportunities. Thus, for a given effective engine displacement that is less than the full displacement of the engine, a particular cylinder may be successively fired during one firing opportunity, skipped during the next firing opportunity and then selectively skipped or fired during the next firing opportunity. The firing sequence may be expressed as a firing density, which indicates a ratio of fired firing opportunities to total firing opportunities. Firing density may be expressed as a fraction, a percentage, or in some other manner With skip fire, much finer engine control is possible than by using only a fixed set of deactivated cylinders.

An issue with skip fire controlled engines is the possibility of unacceptable NVH associated with some firing sequences and cylinder loads. One approach to dealing with such issues is to not use particular firing densities or firing sequences that are known to produce unacceptable NVH levels. Instead, other firing densities or firing sequences are used and the cylinder output is adjusted accordingly (e.g., by adjusting the injected fuel mass into the cylinder) so that the desired engine output is delivered. Various approaches of this kind are described in co-assigned U.S. patent application Ser. No. 13/654,244, which is incorporated herein in its entirety for all purposes.

During normal driving, an engine typically must operate over a wide range of engine speeds and engine loads. To meet these changing operating conditions, a skip fire controlled engine may transition between various firing densities. For instance, a commercially available skip fire controller that provides for seventeen (17) different firing densities, each indicative of a different reduced effective engine displacement, is available. In contrast, with conventional variable displacement, a set of one or more cylinders are continuously fired, while a second set of one or more different cylinders are continually deactivated or skipped. For example, an 8-cylinder variable displacement engine may deactivate blocks of cylinders (i.e. 2, 4 or 6 cylinders) so that it is operating using only the remaining (i.e., 6, 4 or 2) cylinders. With significantly more firing densities available, skip fire offers significantly more refined engine control compared to conventional displacement engine control.

Dynamic Skip Fire (DSF) Engine Control

With certain implementations of skip fire engine control, a decision to fire or not fire a given cylinder of an engine is made dynamically, meaning on a firing opportunity-by-firing opportunity basis. In other words, prior to each successive firing opportunity, a decision is made to either fire or skip the firing opportunity. In various embodiments, the firing sequence is determined on a firing opportunity by firing opportunity basis by using a sigma delta, or equivalently a delta sigma, converter. Such a skip fire control system may be defined as dynamic skip fire control. For more details on DSF, see U.S. Pat. Nos. 7,849,835, 9,086,020 and 9,200,575, and U.S. application Ser. No. 14/638,908, each incorporated by reference herein for all purposes.

Skip fire engine control, including DSF, can offer various advantages, including substantial improvements in fuel economy for spark ignition engines where pumping losses may be reduced by operating at higher average MAP levels. With compression ignition engines, skip fire control provides a means to control the engine exhaust gas temperature over a wide range of engine operating conditions. In particular, skip fire control may be used to modulate exhaust gas temperatures within a range where aftertreatment emission control systems can efficiently reduce tailpipe emissions. Various approaches of this kind are described in co-assigned U.S. patent application Ser. No. 15/347,562, which is incorporated herein in its entirety for all purposes. Use of skip fire control can also offer greater than a twenty percent (20%) improvement in efficiency in compression ignition engines at light loads, for example, loads less than 10% of the engine's maximum output.

Exemplary Lean Burn Engine and Exhaust Systems

FIG. 1A is a schematic diagram of an exemplary system 10 including an engine 12 and aftertreatment system 14A.

The engine 12 includes a plurality of cylinders 16 where combustion occurs. In the embodiment shown, the engine 12 includes four (4) cylinders 16. It should be understood that the engine 12 as illustrated is merely exemplary and may include either fewer or more cylinders 16. In addition, the engine 12 can be either a compression ignition or a spark-ignition (SI) engine. For the sake of simplicity, the discussion below of the operation of the engine 12 is largely within the context of a compression ignition engine, such as a Diesel engine. It should be understood, however, that many of the features discussed below are equally applicable to other types of engines, such as SI engines.

During operation of the engine 12, exhaust gases from the combustion process exit the cylinders 16 and are vented to the exhaust system 14A by way of an exhaust manifold 18.

The exhaust system 14A includes one or more aftertreatment elements to reduce emission of noxious material into the environment. These elements may include one or more of (a) an oxidizing catalytic converter 22, (b) a particulate filter 20, (c) a reduction agent injection system 24, and/or (d) a reducing catalytic converter 26. Collectively, these various aftertreatment elements or devices are often referred to as the aftertreatment system 14A.

The oxidizing catalytic converter 22 oxidizes unburned hydrocarbons and carbon monoxide in the exhaust stream. Since the engine 12 is typically operating with a lean air/fuel ratio, there is generally adequate oxygen in the exhaust stream to oxidize these incomplete combustion products.

The particulate filter 20 removes particulate matter, i.e. soot, which may be present in the exhaust stream.

The reduction agent injection system 24 introduces a reducing agent, often a mixture of urea and water, into the exhaust stream.

The reducing catalytic converter 26 may use selective catalytic reduction (SCR) to reduce nitrous oxides to molecular nitrogen and water. The reducing catalytic converter 26 may use two catalysts. A first catalyst 28 transforms urea introduced by the reducing agent 24 to ammonia and transforms nitrous oxides and ammonia into molecular nitrogen and water. A second catalyst 30 utilizes excess ammonia, which may slip through the first catalyst 28, to continue to reduce residual $NO_x$.

After passing through the reducing catalytic converter 26, the exhaust stream leaves the exhaust system 14A via tailpipe 32 and goes into the environment. The aforementioned aftertreatment elements in the exhaust system 14A are sufficient to remove noxious pollutants from the exhaust stream in compliance with current environmental regulations. To the extent a further reduction in pollutants is desired, or environmental regulations become more stringent, additional elements can be added to the exhaust system 14A without departing from the present invention as described herein.

The exhaust system 14A may additionally include one or more temperature sensors. Such temperature sensors may include (a) a temperature sensor 34 to monitor the temperature of the particulate filter 20, (b) a temperature sensor 36 to monitor the temperature of oxidizing catalytic converter 22, and (c) a temperature sensor 38 to monitor the temperature of the reducing catalytic converter 26.

The arrangement of the exhaust system of 14A may be advantageous when the particulate filter 20 needs to be regularly cleaned by an active process that raises its temperature to around 500 C to 600 C to burn out accumulated soot. The active cleaning process may include intentionally introducing non-combusted hydrocarbons into the exhaust stream and oxidizing them in the oxidizing catalytic converter 22 to produce heat. By positioning the oxidizing catalytic converter 22 upstream from the particulate filter 20, the temperature within the particulate filter 20 may be actively controlled during the cleaning process.

Figure 1B:
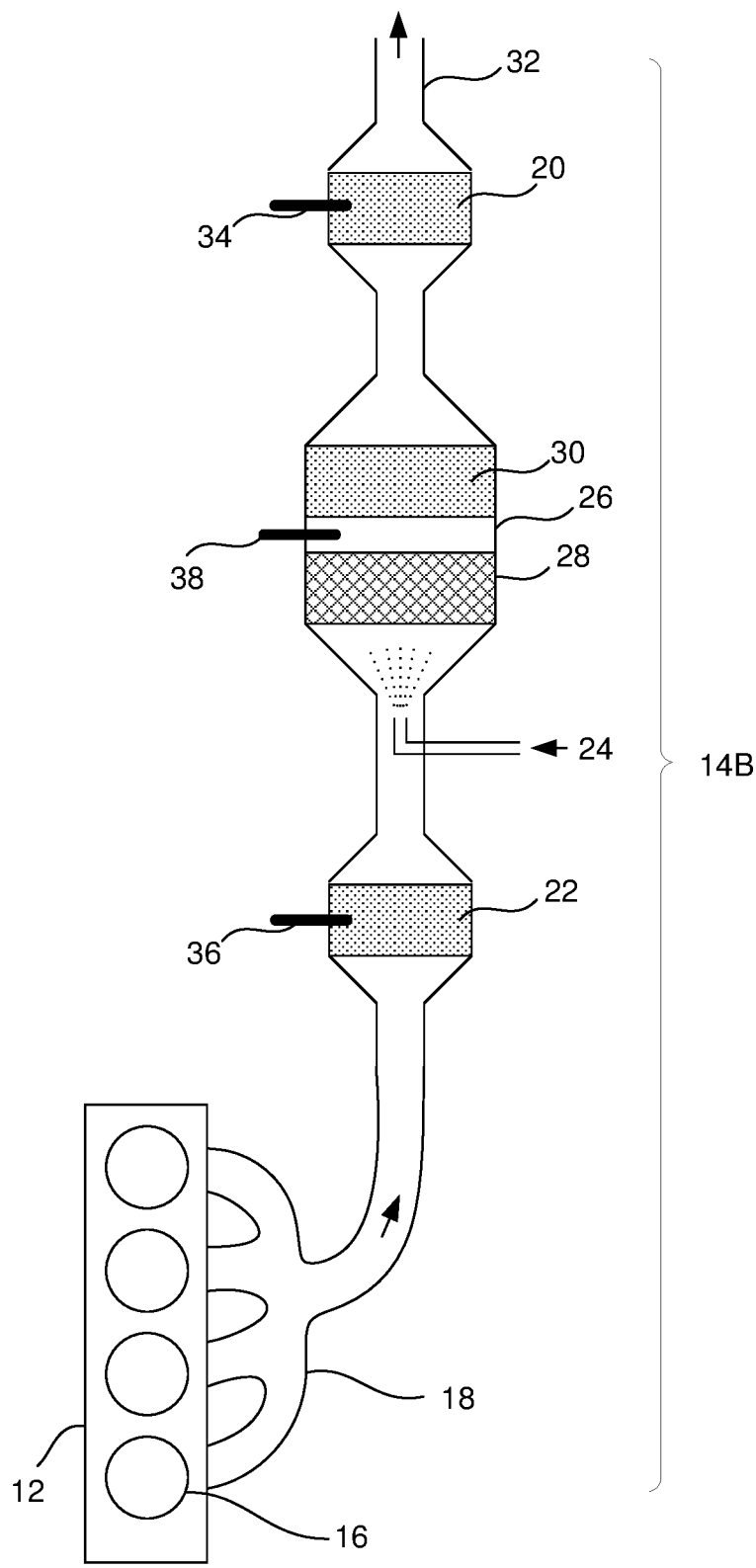
FIG. 1B is a schematic diagram of an alternative representative engine exhaust system for an exemplary internal combustion engine.

Referring to FIG. 1B, the system 10 including the lean burn engine 12 and an alternative representative exhaust system 14B is shown. With this arrangement, the particulate filter 20 is placed downstream of the reducing catalytic converter 26. Otherwise the exhaust systems 14A and 14B are essentially the same.

In yet another embodiment (not illustrated), the particulate filter 20 may be situated upstream of the reducing catalytic converter 26 and oxidizing catalytic converter 22. Such as arrangement may be particularly applicable to a gasoline lean burn engine.

It should be noted that the particular order of the various aftertreatment elements shown in FIG. 1A and FIG. 1B are merely exemplary and should not be construed as limiting. The order of the various aftertreatment elements described herein, as well as additional aftertreatment elements that may be used, may widely vary to meet operating conditions, regulatory requirements and/or other objectives.

It also should be noted that the exhaust systems 14A and 14B may also include other types of sensors besides temperature sensors. Such sensors may include (not illustrated), for example, oxygen sensors placed before and after the oxidizing catalytic converter 22, and a $NO_x$ sensor situated downstream from the reducing catalytic converter 26.

It should further be noted that various other features and elements not shown in FIGS. 1A and 1B may be situated between the engine and the aftertreatment elements of exhaust systems 14A and 14B. Such elements may include, but are not limited to, an exhaust gas recirculation system (EGR), a turbine to power a turbocharger, and a waste gate to control exhaust gas flow through the turbine, etc.

Exhaust System Operating Temperatures

The exhaust stream will generally be at its hottest temperature as it passes from the engine 12 through the exhaust manifold 18. As the exhaust stream passes through the subsequent elements of the exhaust system 14A/14B, the gases tend to cool from one stage to the next. The aftertreatment elements 20, 22 and 26 are therefore typically arranged in the order requiring the highest to lowest operating temperatures. For example, the exhaust gasses passing through the oxidizing catalytic converter 22 are hotter than that passing thru to the downstream elements 20 and 26 in FIG. 1A. In the arrangement of FIG. 1B the gasses passing through the reducing catalytic converter 26 are hotter than that of the downstream particulate filter 20. It should be appreciated that exothermic chemical reactions may occur in any aftertreatment element, which may raise the temperature of the aftertreatment element and any other downstream elements.

In order for the aftertreatment systems 14A and 14B to properly function, the elements 20, 22 and 26 each need to operate within a specified elevated temperature range. In a non-exclusive embodiment, the representative operating range for the reducing catalyst 26 is in the approximate range of 200° to 400° C. It should be understood that these temperature values are approximate and not absolute. Each may vary, for example, within ten percent (+/−10%) from 200° C. and 400° C. If the reducing catalytic converter 26 (including reducing catalytic converters 28, 30) is last in line for a given aftertreatment system, the upstream elements including the particulate filter 20 and the oxidizing catalyst 22, regardless of their order, will typically operate at somewhat higher temperature ranges.

Figure 2:
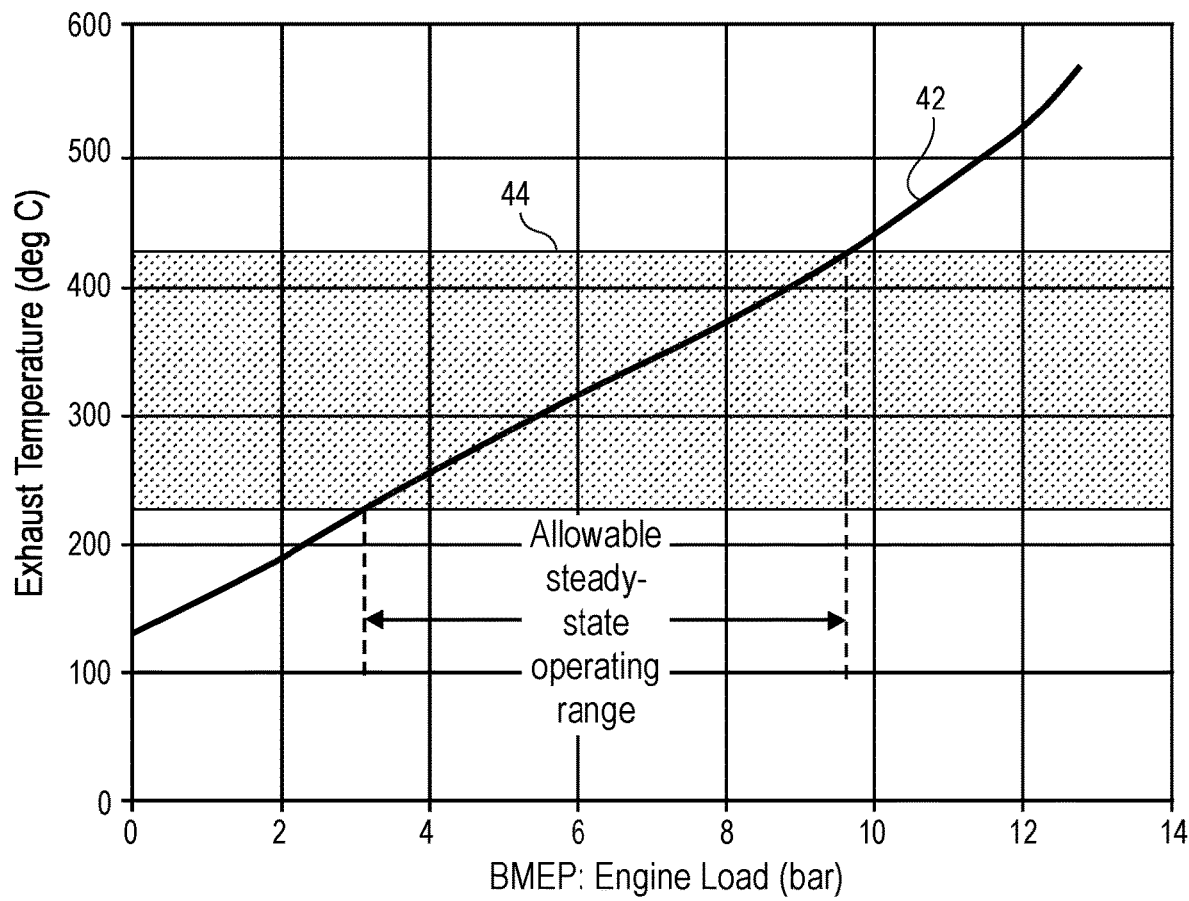
FIG. 2 is a plot of exhaust gas temperature versus engine load for an exemplary internal combustion engine.

Referring to FIG. 2, a plot 40 is illustrated depicting the relationship of the exhaust gas temperature at the exhaust manifold 18 versus the operating load for a representative boosted, compression-ignition, engine 12 operating at 1250 rpm.

In this example, the curve 42 represents the exhaust gas temperature as a function of engine load expressed in Brake Mean Effective Pressure (BMEP) for the case where all engine cylinders are firing under substantially the same conditions.

The operating range 44 is the temperature range of the exhaust gases in the exhaust manifold 18. In this particular example, the operating range is approximately 225° to 425° C.

As previously noted, the exhaust gases will typically cool somewhat at each stage of either aftertreatment system 14A/14B. For example, by the time the exhaust gases reach the reducing catalytic converters 28, 30 of the reducing catalytic converter 26 in aftertreatment system 14A, the temperature may have dropped approximately 25° C. In other words, the temperature of the exhaust gases is at or near the representative operating range of the reducing catalytic converter 26, which as noted above, may be 200° to 400° C.

It is important to note that the provided temperature ranges at the exhaust manifold 18 and at the last stage of the aftertreatment systems 14A/14B are merely exemplary and should not be construed as limiting in any regard. On the contrary, different engine operating points and engine designs may have different starting, intermediate, and ending temperatures and temperature offsets between the exhaust manifold 18 and the last element of the aftertreatment systems 14A/14B. In fact, in some cases, the exhaust gas temperatures may rise in the exhaust system due to exothermic chemical reactions. As such, the actual temperature values and ranges as provided herein should not be construed as limiting the scope of the present invention.

Inspection of FIG. 2 indicates that a sizable portion of the operating range of the engine 12 falls outside of the preferable steady-state operating range (i.e., outside an acceptable range for effective $NO_x$ removal). Advantageously, as described in more detail below, skip fire engine control may be effectively used as a strategy to modulate and maintain the exhaust gas temperatures within the preferable steady-state operating range.

Skip Fire Control System

Figure 3:
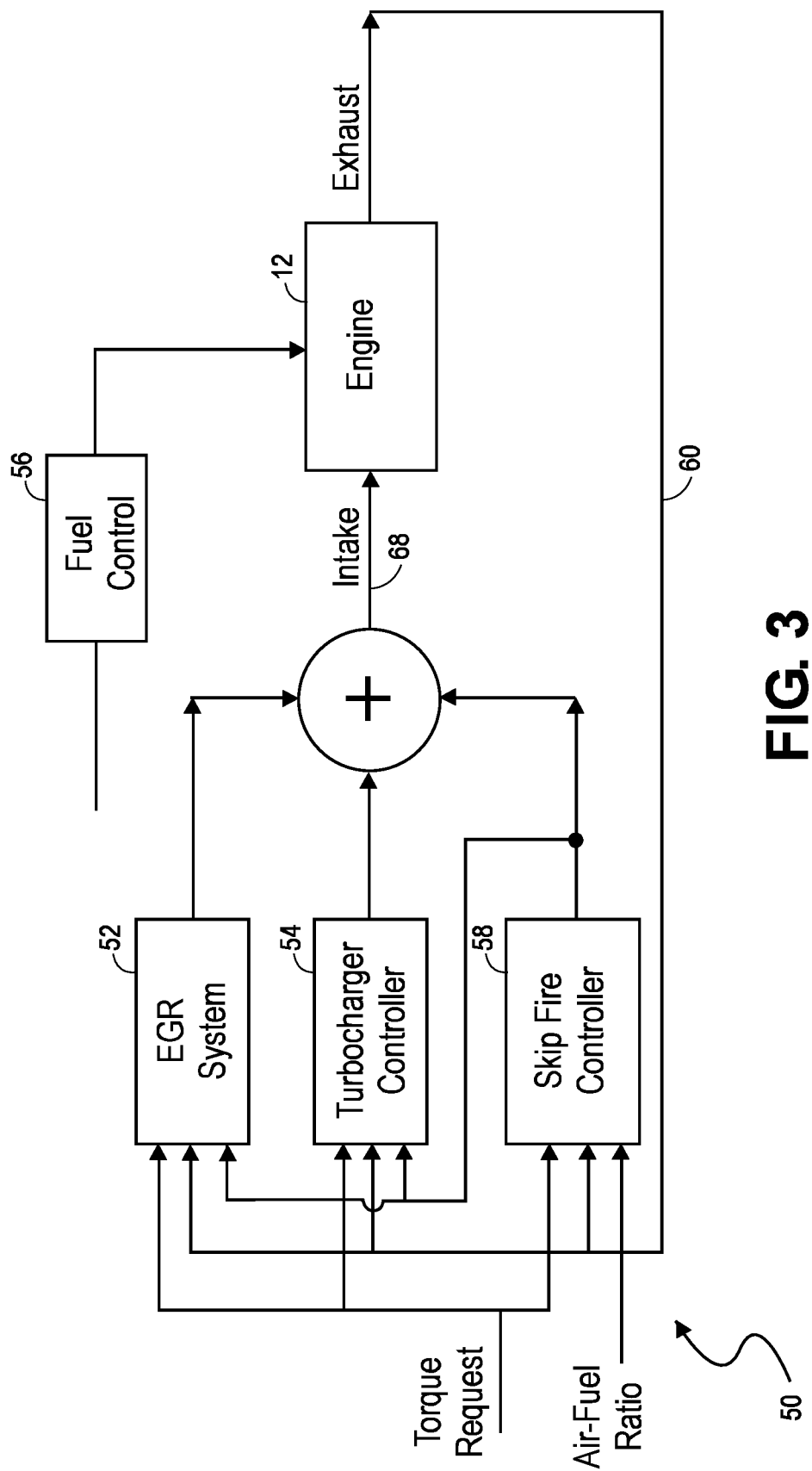
FIG. 3 is a schematic diagram of an engine controller for the exemplary internal combustion engine according to a non-exclusive embodiment of the present invention.

Referring to FIG. 3, a schematic diagram of an engine controller 50 illustrating a number of controls and/or systems for controlling operation of the engine 12 in a skip fire mode are illustrated. These control systems include an Exhaust Gas Recirculation (EGR) system controller 52, a boost controller 54, a fuel control unit 56, and a skip fire controller 58.

The EGR system controller 52 operates to recirculate a portion of the exhaust as back to the cylinders 16 of the engine 12. The recirculation tends to dilute the fresh air intake stream into the cylinder with gases inert to combustion. The exhaust gases act as absorbents of combustion generated heat and reduce peak temperatures within the cylinders 16. As a result, $NO_x$ emissions are typically reduced. In a compression-ignition Diesel engine for instance, the exhaust gas replaces some of the oxygen in the pre-combustion mixture. Since $NO_x$ forms primarily when a mixture of nitrogen and oxygen is subjected to high temperature, the lower combustion temperatures and reduction in the amount of oxygen in the working chamber cause a reduction in the amount of generated $NO_x$.

The boost controller 54 controls the amount of compressed air that is inducted into the cylinders 16 of the engine 12. Boosting, that is supplying compressed air to engine 12, allows generation of more power compared to a naturally aspirated engine since more air, and proportionally more fuel, can be input into the cylinders 16. The boost controller 54 may operate with either a turbocharger, a supercharger or a twincharger. The key difference between a turbocharger and a supercharger is that a supercharger is mechanically driven by the engine, often through a belt connected to the crankshaft, whereas a turbocharger is powered by a turbine driven by the exhaust gas of the engine. Compared with a mechanically driven supercharger, turbochargers tend to be more efficient, but less responsive. A twincharger refers to an engine with both a supercharger and a turbocharger.

The fuel control unit 56 is used to determine the amount of fuel required by the cylinders 16 of the engine 12. The amount of injected fuel is based primarily on the torque request, since the efficiency of torque generation is not strongly influenced by the air/fuel ratio for lean burn engine. There must however be adequate air flow into the engine to combust the delivered fuel and result in lean burn operation. Most vehicles rely on a mass airflow sensor to determine the amount of air. Given the air flow into the engine and injected fuel mass, the air-fuel ratio, which is one of the inputs into engine controller 50 may be determined. Based on this value, the fuel control unit 56 makes a determination of how much fuel to inject into the cylinders 16 of the engine 12. As previously noted, the air-fuel ratio for a Diesel engine may range from approximately 16 to 55 compared to 14.6 for a stoichiometric air-fuel ratio.

The skip fire controller 58 is responsible for determining if the engine 12 should operate in either a full displacement mode or in the skip fire mode. When no firing fraction, other than one, is adequate to meet a high torque demand, then the skip fire controller will operate the engine 12 at full displacement. Otherwise, the engine is typically operated at one of multiple reduced effective displacements, each defined by a different firing density or fraction, in the skip fire mode.

When in the skip fire mode, the skip fire controller 58 is responsible for determining a firing density or firing fraction that meets a current torque request. In other words, the skip fire controller 58 defines a firing fraction that is suitable to (1) meet the current torque request and (2) operate the vehicle at acceptable levels of NVH. Satisfying these two constraints generally have the highest priority in the engine control architecture. Other parameters that may also be optimized are (3) fuel efficiency, (4) exhaust gas temperature, and (5) air/fuel ratio. Point (3) needs no explanation, since it is clearly advantageous to minimize fuel consumption. Points (4) and (5) stem from a desire to reduce the burden on aftertreatment elements in the exhaust system and to improve tailpipe emissions. As driving conditions change the engine speed and torque demand change), the skip fire controller 58 is responsible for selecting different firing fractions, each indicative of different reduced effective displacements less than the full displacement of the engine 12, that best meets the five objects (1) through (5) articulated above.

The skip fire controller 58 receives at least three inputs, including (a) a current torque request, (b) a signal 60 indicative of the temperature of the exhaust gases in the aftertreatment system 14A/14B, and (c) an air-fuel ratio of one or more active cylinders 16 of the engine 12. In response, the skip fire controller 58 generates a firing density or fraction 62. With these three inputs, the skip fire controller 58 is able to provide ever finer control of the engine 12, selecting an optimum firing density that best meets objectives (1-5) mentioned above.

The boost controller 54 receives the (a) current torque request, (h) signal 60 indicative of temperature of the exhaust gases in the aftertreatment system 14A/14B, and (c) air-fuel ratio provided to one or more of the cylinders 16 of the engine 12. In response, the boost controller 54 determines the amount of compressed air that is to be inducted into the cylinders 16 of the engine 12.

The EGR system controller 52 similarly receives the (a) current torque request, (b) signal 60 indicative of temperature of the exhaust gases in the aftertreatment system 14A/14B, and (c) air-fuel ratio provided to one or more of the cylinders 16 of the engine 12. In response, the EGR system controller 52 determines the amount or degree of exhaust gases that are to be recirculated. Again, by receiving the three inputs (a), (b) and (c), the EGR system is able to make a more precise determination on the amount of exhaust gases to recirculate.

The outputs from the skip fire controller 58, the boost controller 54 and the EGR controller 52 are then all considered to generate an air intake value 68, which is provided to the cylinders 16 of the engine 12. In addition, as noted above, the fuel control unit 56 considers the air intake value 68 in providing an appropriate amount of fuel to the cylinders 16 of the engine 12. The fuel and the air, together, define an air-fuel mixture provided to the cylinders 16, characterized by an air-fuel ratio.

In a non-exclusive embodiment, the skip fire controller 58 is a dynamic skip fire controller. In other words, the skip fire controller 58 makes a decision to fire or not fire a given cylinder of an engine dynamically, meaning on a firing opportunity-by-firing opportunity basis.

Figure 4:
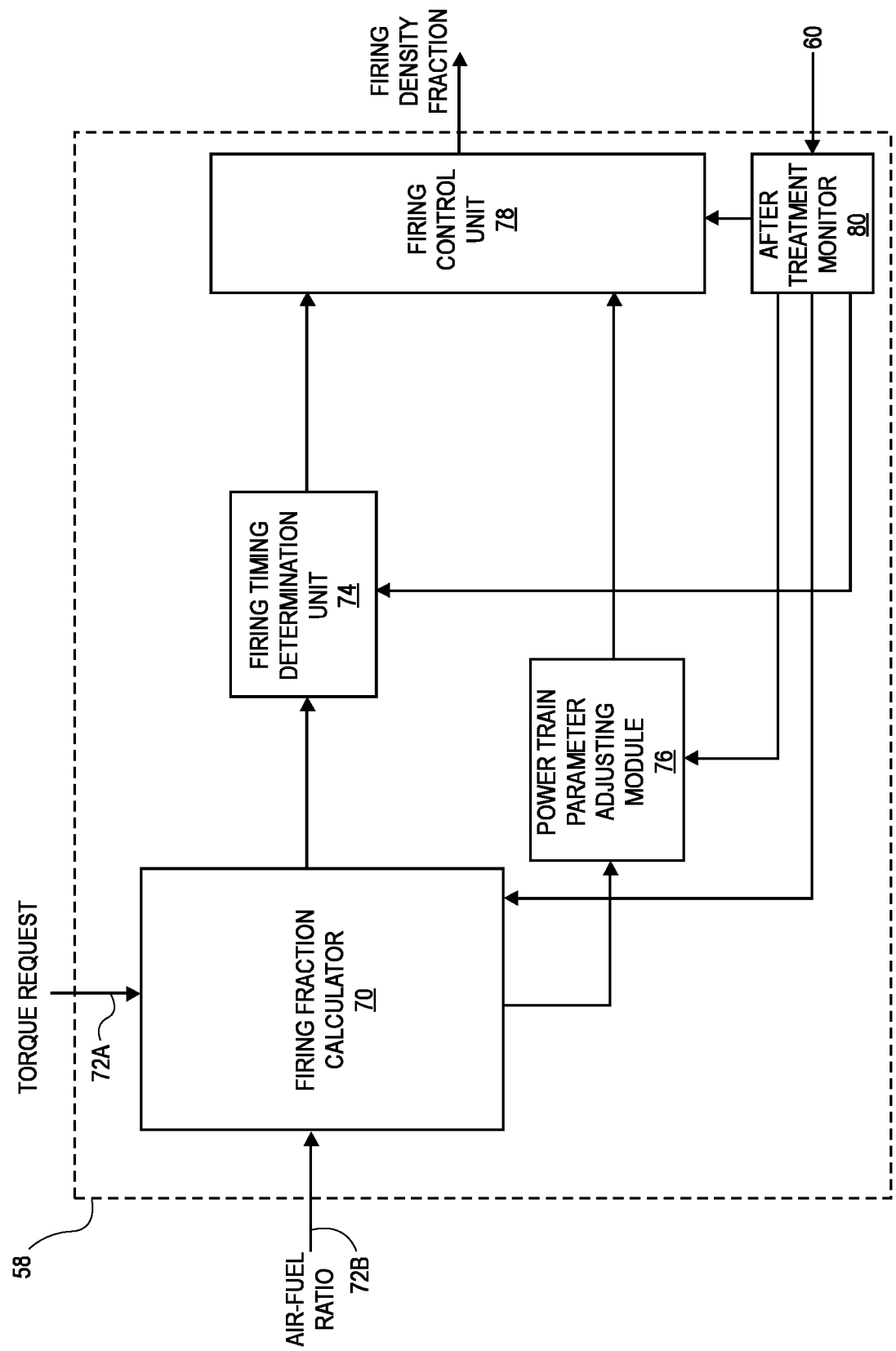
FIG. 4 is a logic diagram of a skip fire controller arrange to operate the exemplary internal combustion engine according to a non-exclusive embodiment of the present invention.

Referring to FIG. 4, a logic diagram of the skip fire controller 58 is illustrated.

The skip fire controller 58 includes a firing fraction calculator 70, a firing timing determination unit 74, a power train parameter adjusting module 76, a firing control unit 78 and an aftertreatment monitor 80.

The firing fraction calculator 70 receives three inputs including (a) a current torque request 72A, (b) a temperature of the exhaust gases as provided by the aftertreatment monitor 80, which receives signal 60 and (c) an air-fuel ratio 72B. In response, the firing fraction calculator 70 determines a skip fire firing fraction or firing density that best matches the five objectives (1-5) noted above. It should be appreciated that a firing fraction or density may be conveyed or represented in a wide variety of ways. For example, the firing fraction or density may take the form of a firing pattern, sequence or any other firing characteristic that involves or inherently conveys the aforementioned percentage or density of firings.

In yet other embodiments, the firing fraction calculator 70 may take into account other information in determining the firing density. Such other information may include, for example, oxygen sensor data, $NO_x$ sensor data, ambient air temperature, exhaust gas temperature, catalyst temperature, barometric pressure, ambient humidity, engine coolant temperature, etc. In various embodiments, as these parameters change with the passage of time, the firing fraction may be dynamically adjusted in response to the changes.

The aftertreatment monitor 80 represents any suitable module, mechanism and/or sensor(s) that obtain data relating to a temperature of an aftertreatment element. If the reducing catalytic converter 26 has the narrowest operating range of any aftertreatment element, only data representative of its temperature may be used. Alternatively, the aftertreatment temperature may correspond to the temperature of any or all of the particulate filter 20, oxidizing catalytic converter 22 and/or reducing catalytic converter 26 (see FIGS. 1A and 1B). In various embodiments, for example, the aftertreatment monitor 80 may include or work in cooperation with oxygen sensor data from oxygen sensors in the aftertreatment system 14A/14B and $NO_x$ sensors placed before and after the reducing catalytic converter 26. Aftertreatment monitor 80 may also include such inputs as ambient air temperature, exhaust gas temperature in the exhaust manifold, barometric pressure, ambient humidity and/or engine coolant temperature.

In some embodiments, the skip fire controller 58 and the aftertreatment monitor 80 do not require a direct measurement or sensing of the temperature of an aftertreatment element. Instead, an algorithm using one or more inputs, such as a catalytic converter temperature model, may be used to estimate the aftertreatment element or system temperature. The model may be based on one or more of the above parameters (e.g., oxygen sensor data, $NO_x$ sensor data, exhaust gas temperature, ambient temperature, barometric pressure, ambient humidity, etc.) that are representative or related to a catalytic converter temperature.

The firing timing determination unit 74 receives input from the firing fraction calculator 70 and/or the power train parameter adjusting module 76 and is arranged to issue a sequence of firing commands (e.g., drive pulse signal) that are provided to the firing control unit 78. The firing timing determination unit 74 may take a wide variety of different forms. For example, in some embodiments, the firing timing determination unit 74 may utilize various types of lookup tables to implement the desired control algorithms. In other embodiments, a sigma delta converter or other mechanisms are used. The sequence of firing commands (sometimes referred to as a drive pulse signal 75) are provided to the firing control unit 78, which orchestrates the actual firings of the cylinders 16 of the engine 12.

The power train parameter adjusting module 76 directs the firing control unit 78 to set selected power train parameters appropriately to ensure that the actual engine output substantially equals the requested engine output at the commanded firing fraction or density. By way of example, the power train parameter adjusting module 76 may be responsible for determining the desired fueling level, number of fuel injection events, fuel injection timing, exhaust gas recirculation (EGR) level, and/or other engine settings that are desirable to help ensure that the actual engine output matches the requested engine output.

The firing control unit 78 receives input from the firing timing determination unit 72 and the power train parameter adjusting module 76. Based on the aforementioned inputs, the firing control unit 78 directs the engine to operate in the firing sequence 75 determined by the firing timing determination unit 74 with the engine parameters determined by the power train parameter adjusting module 76.

By way of example, some suitable firing fraction calculators, firing timing determination units, power train parameter adjusting modules and other associated modules are described in co-assigned U.S. Pat. Nos. 7,954,474; 7,886,715; 7,849,835; 7,577,511; 8,099,224; 8,131,445; 8,131,447; 9,086,020; and 9,120,478: U.S. patent application Ser. Nos. 13/774,134; 13/963,686; 13/953,615; 13/886,107; 13/963,759; 13/963,819; 13/961,701; 13/843,567; 13/794,157; 13/842,234; 13/004,839, 13/654,244 and 13/004,844, each of which is incorporated herein by reference in its entirety for all purposes.

Compression Ignition Engine Air-Fuel Ratio Range

Compression-ignition engines can operate over a wide range of air-fuel ratios. For example, a Diesel engine can operate with air-fuel ratio ranging from 16 to 55 depending on speed/load conditions. As previously noted, the torque of a Diesel engine is determined by the amount of fuel injected, not the inducted air mass since an excess of oxygen exists to combust all the fuel. However, the inducted air mass ingested affects air-fuel ratio, which in turn, affects exhaust gas temperature and engine-out emissions.

Figure 5:
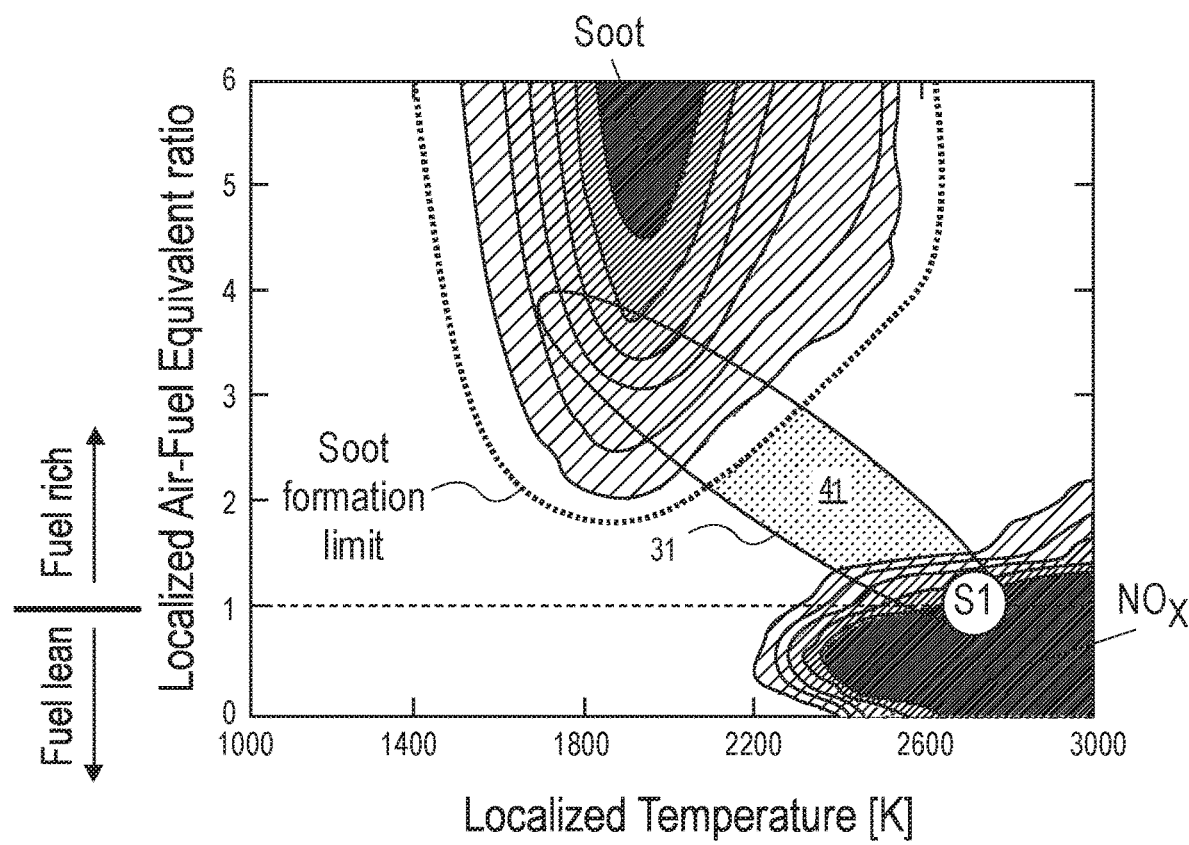
FIG. 5 is a plot depicting the relationship between the localized fuel-air equivalence ratio and localized combustion temperature for a representative compression-ignition engine.

Referring to FIG. 5, a plot depicting the relationship between the localized fuel/air equivalence ratio and combustion temperature for a representative Diesel engine is illustrated. As depicted, localized fuel-air equivalence ratios are provided along the vertical axis, while the temperature in degrees Kelvin or "K" of localized temperature during combustion is provided along the horizontal axis. The fuel-air equivalence ratio is defined as the ratio of the fuel-to-oxidizer ratio to the stoichiometric fuel-to-oxidizer ratio.

The air-fuel ratios provided along the vertical axis are considered "localized" because Diesel engines are typically stratified, meaning the air-fuel mixture is not homogeneous within the cylinder. As a result, the concentration of the fuel is higher in some regions (e.g., typically near the top of the cylinder where the fuel is injected) compared to other regions (e.g., near the bottom, away from the injected fuel jet) of the cylinder. Fuel is injected in a jet which disperses into fine drops and combustion primarily occurs in the vicinity of the fuel injection jet.

Diesel engine operation generally occurs within the region defined by an oval 31. Operation in the upper left side of the oval 31 corresponds to operation with an average air/fuel ratio near stoichiometry. Operation in the lower right side of the oval 31 correspondence to operation at high average air/fuel ratios. Note that the average air/fuel ratio is not simply the inverse of the fuel-air equivalence ratio multiplied by the stoichiometric air/fuel ratio (14.6) because of the inhomogeneous nature of Diesel engine combustion.

The dashed horizontal line represents stoichiometry, or a fuel-air equivalence ratio of 1 (corresponding to an air/fuel ratio of approximately 14.6 as previously described). Above stoichiometry, the fuel-air ratio is rich. Below stoichiometry, the fuel-air ratio is lean. For reference, the typical operating region of spark ignition (SI) engines is also denoted in the figure. The SI engine operates in the $NO_x$ generation region, meaning some type of $NO_x$ reducing aftertreatment element, such as a three-way catalyst, is typically needed.

The plot further shows a soot region define by "soot formation limit" line. Operating regions within the soot formation limit line generate detectable quantities of soot, with more soot produced as the shading becomes darker. When operating within the soot region, a particulate filter is typically needed to reduce soot in the exhaust stream prior to releasing the exhaust stream into the atmosphere. To minimize the cleaning burden on the particulate filter, operation within the more darkly shaded areas should be avoided or at least minimized.

The plot further shows a $NO_x$ emission region. Again, areas of darker shading represent higher concentrations of undesirable pollutants in the exhaust stream, in this case $NO_x$. A reducing catalytic converter is typically needed to reduce $NO_x$ emissions. As with soot, it is desirable to operate away from the regions of highest $NO_x$ emissions to reduce the burden on the $NO_x$ aftertreatment system. From an emission viewpoint, operation in the dotted area 40 is desired, since both soot and $NO_x$ emissions are intrinsically low without any aftertreatment. An air-fuel ratio between 20 and 35 may be desired so that most combustion can occur in the operating region 40. Operation within region 40 may be maintained by adjust the firing density, boost level, exhaust gas recirculation level, and the lift profile of the intake and exhaust valves. In some embodiments, an engine may be controlled in such a manner to meet environmental regulations without use of any aftertreatment system. Alternatively, the aftertreatment system may be reduced in size and perhaps complexity, since the pollutant load the aftertreatment system needs to remove is reduced.

The plot of FIG. 5 thus demonstrates, particularly for compression-ignition engines, the value of controlling the air-fuel ratio as part of a skip fire control algorithm. With addition of air-fuel ratio and exhaust temperature as inputs to skip fire controller 58, an appropriate firing density can be selected for a desired torque output, air-fuel ratio and exhaust gas temperature. The selected firing density may or may not be optimal for fuel consumption. However, in certain circumstances, achieving low tailpipe emissions to meet regulatory requirements is more important than the absolute highest fuel efficiency.

In order to accurately control the air-fuel ratio in a firing cylinder, the inducted mass air charge (MAC) must be accurately estimated. As disclosed in U.S. Pat. No. 9,945,313 and U.S. patent application Ser. No. 15/628,309, both of which are incorporated by reference herein in their entirety for all purposes, determination of inducted air mass is more complex in skip fire controlled engines than in engines operating at a fixed displacement. Adjustments to the cylinder MAC may be made based on a firing history of the cylinder and on an engine skip-fire sequence preceding firing of the cylinder.

As described above, controlling the air-fuel ratio in a firing cylinder is an important element in skip fire control of a lean burn engine. Additionally, control of fuel injection timing and fuel injection pattern is also important. Even though the air-fuel ratio is the same in different working cycles, the generated torque and combustion byproducts may differ depending on the timing and pattern of the fuel injection. Fuel injection timing refers to when fuel is injected in a cylinder relative to position of a piston in the cylinder, typically denoted by crankshaft angle. Fuel injection pattern refers to the number and duration of discrete fuel injection events that may occur during a working cycle. For example, rather than all fuel being injected in a single event, the fuel injection may be discontinuous with multiple injection events in a working cycle that in total deliver the desired fuel mass.

A cylinder that was skipped on one or more prior working cycles will have cooler cylinder walls than if it had been fired. The greatest impact on cylinder wall temperature is from the immediately prior working cycle, but the cylinder firing history for approximately the past five firing opportunities will influence cylinder wall temperature. Additionally, the composition of residual gases in the cylinder may be different if the preceding firing opportunity was a skip rather than a fire. These changes in the initial conditions at the onset of combustion can impact combustion dynamics. To adjust for the different initial combustion conditions, the timing and pattern of fuel injection may be optimized based on the firing history of the cylinder. The desired air-fuel ratio may also be optimized. Adjusting fuel injection timing, fuel injection pattern, and air-fuel ratio may reduce undesirable combustion products and increase fuel efficiency in the fired cylinder.

In addition, during transition from one steady state to another steady state condition (i.e., a transition from one firing density to another), the use of the three inputs as described herein provides flexibility and control to optimize air-fuel ratio and/or exhaust gas temperature in such a way as to minimize spikes in engine-out emissions during firing density transitions, which was previously not possible.

Reducing Emissions During Firing Density Transitions

Figure 6A:
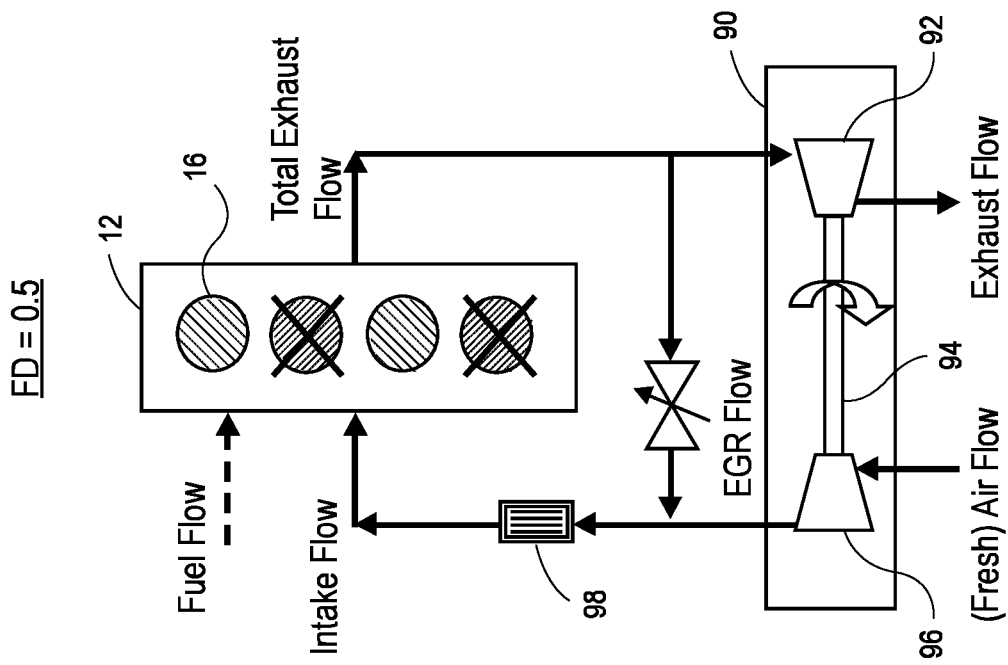
FIGS. 6A-6C are various diagrams illustrating how a spike in particulate emissions by the exemplary internal combustion engine is mitigated during transitions from a high firing density to a low firing density according to a non-exclusive embodiment of the present invention.
Figure 6A:
Figure 6A:
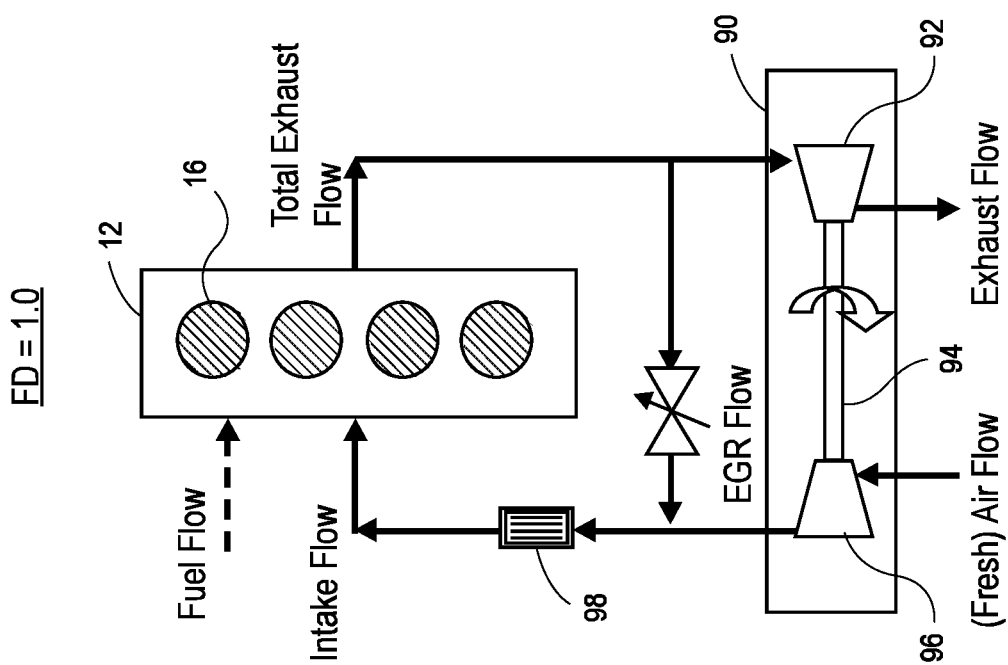

FIG. 6A illustrates a representative engine 12 including four cylinders 16. The engine 12 is arranged to receive fuel from the fuel control unit 56 (see FIG. 3) and intake gas flow from a combination of an EGR system 88 controlled by the EGR system controller 52 (see FIG. 3) and a turbocharger system 90 controlled by the boost controller 54 (see FIG. 3). The EGR system 88 includes an EGR flow valve that controls flow of exhaust gases back into the intake gas flow of the engine 12. The turbocharger system 90 includes an exhaust turbine 92, a shaft 94, and a compressor wheel 96.

The compressor wheel 96 is part of a compressor that serves to increase pressure in an intake manifold above atmospheric pressure. An optional cooler 98 may also be provided to cool the intake air allowing a higher MAC. Air from the intake manifold is inducted into a cylinder thru one or more intake valve(s) on each cylinder.

FIG. 6A depicts an example of a firing density (FD) transition from 1.0 to 0.5. Prior to the transition, all four cylinders are fired as illustrated on the left side of the figure. After the transition, only two of the four cylinders are fired, while the remaining two cylinders are skipped, as graphically illustrated by the "X" through two of the four cylinders 16 on the right side of the figure.

Figure 6C:
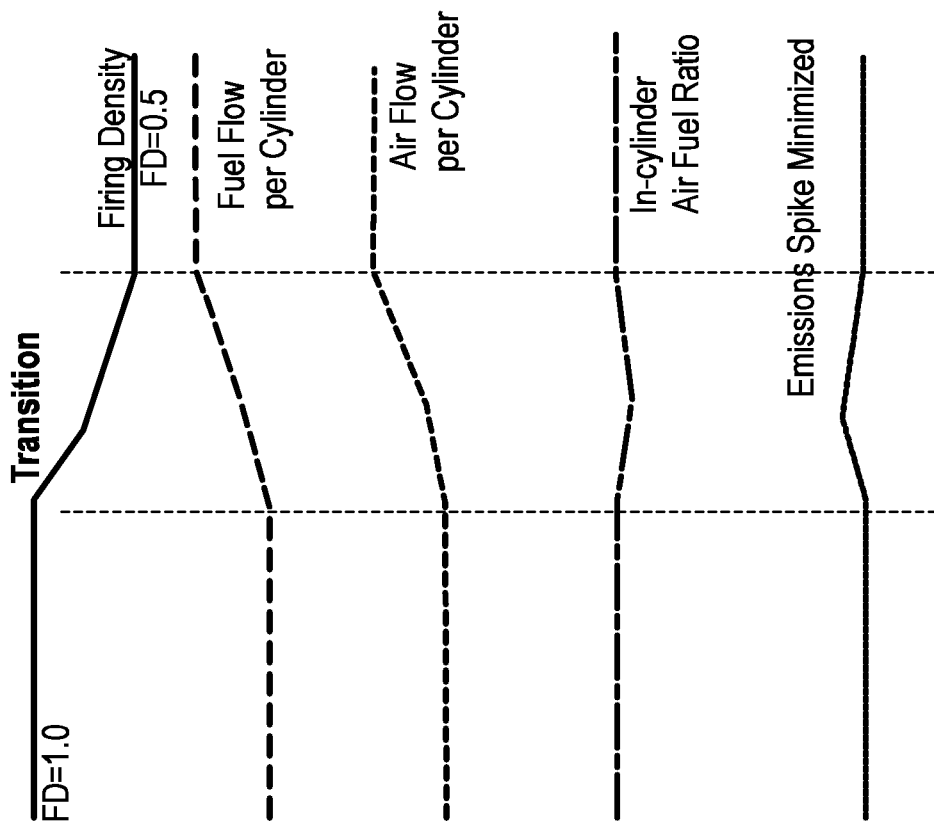
Figure 6B:
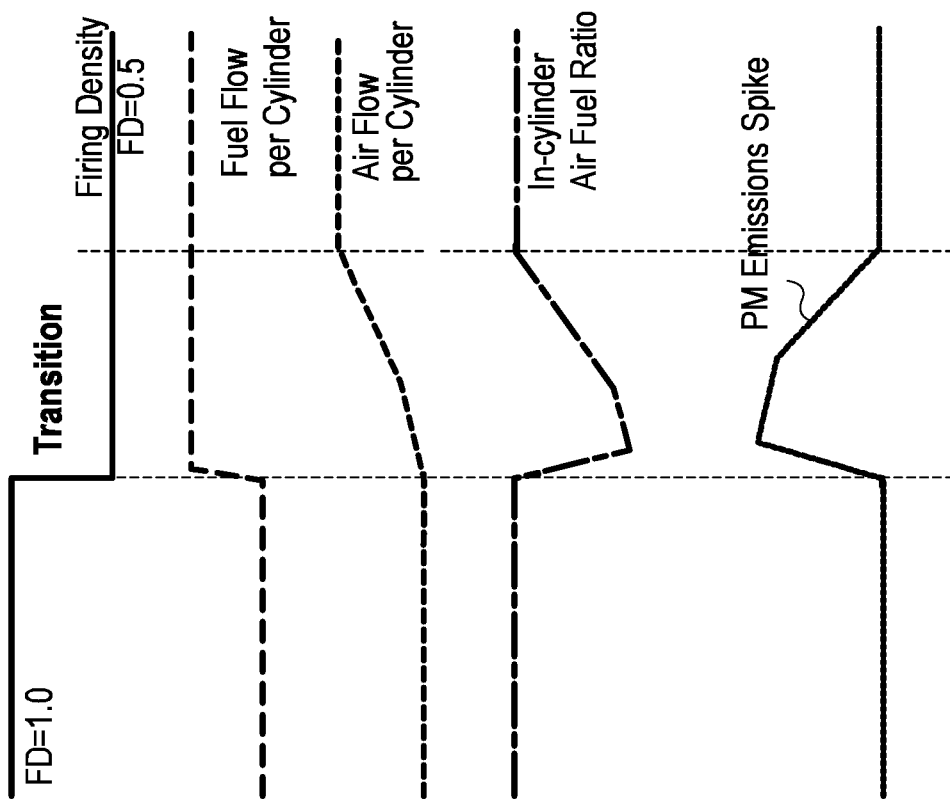

FIGS. 6B-6C are diagrams which depict behavior of various engine parameters thru a firing density transition, such as the transition from a firing density of 1 to a firing density of 0.5 depicted in FIG. 6A. FIG. 6B depicts the engine parameter behavior during an abrupt firing density transition and FIG. 6C depicts the engine parameter behavior during a gradual or smoothed firing density transition.

An abrupt transition may refer to the case where the engine makes the firing density transition in one engine cycle or 4 firing opportunities for a 4-cylinder engine, which takes two engine revolutions for a 4-stroke engine. For an engine operating at 1500 rpm, a typical engine speed, the abrupt transition occurs over a period of 80 milliseconds. As shown in FIG. 6B, when the firing density transitions directly from 1.0 to 0.5, the fuel flow per operating cylinder immediately steps up so that the torque demand (assumed constant over the transition) can now be met by 2 cylinders instead of 4 cylinders. The air flow per cylinder, however, can only adjust gradually due to inherent lag in the turbocharger system 90 adjusting the intake manifold pressure for the new firing density. As a result, the air-fuel ratio drops considerably during the transition, causing a temporary spike in particulate emissions (PM) during the transition.

By contrast, FIG. 6C shows how the PM spike may be significantly reduced by managing the transition from a high firing density to a lower firing density. The management of the transition involves firing at one or more intermediate firing densities between the higher firing density and the lower firing density. Equivalently, the transition between the initial and final target firing density may be viewed as occurring over multiple engine cycles. For instance, if the initial firing density is 1.0 and the target firing density is 0.5, then one or more intermediate firing densities of (0.9, 0.8, 0.7 and 0.6) may be used to smooth the transition. By using one or more intermediate firing densities, the air-fuel ratio in the fired cylinders 16 remains relatively stable, and as a result, the PM spike is minimized. The transition from the initial to the target firing faction may occur over approximately 3 to 15 engine cycles depending on the exact nature of the transition.

Figure 7A:
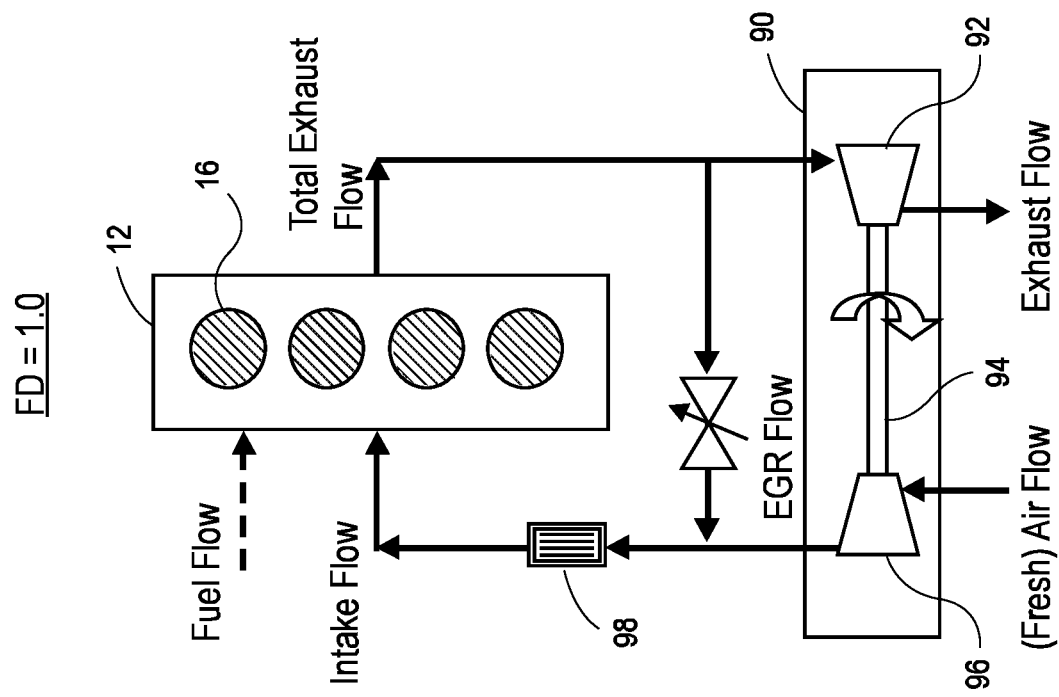
FIGS. 7A-7C are various diagrams illustrating how a spike in $NO_x$ emissions by the exemplary internal combustion engine is mitigated during transitions from a low firing density to a high firing density according to a non-exclusive embodiment of the present invention.
Figure 7A:
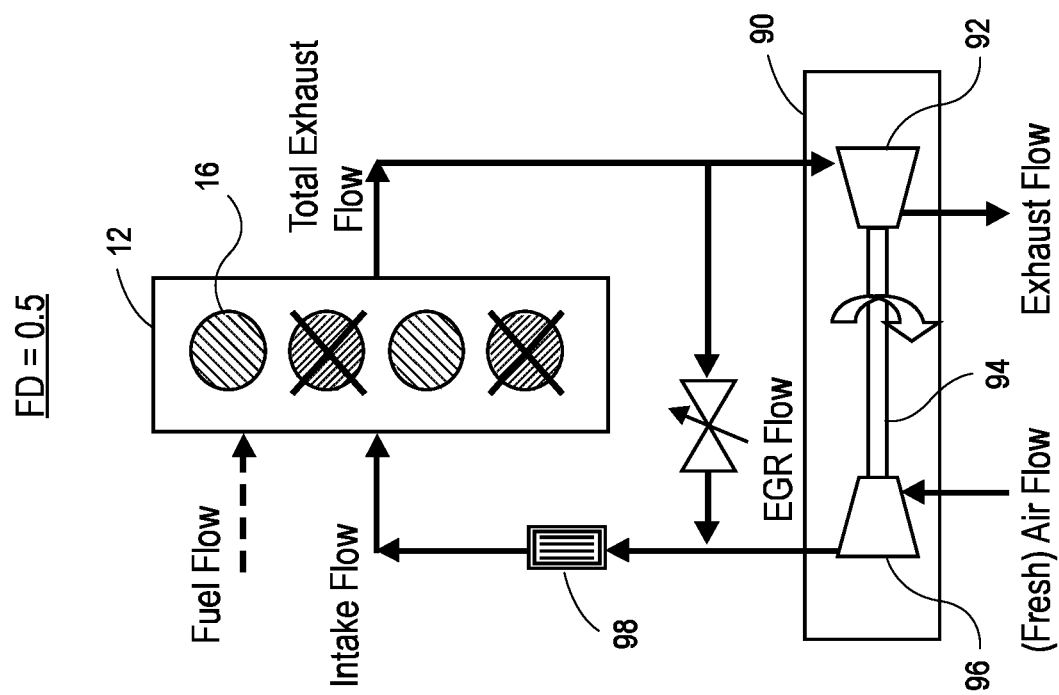
Figure 7C:
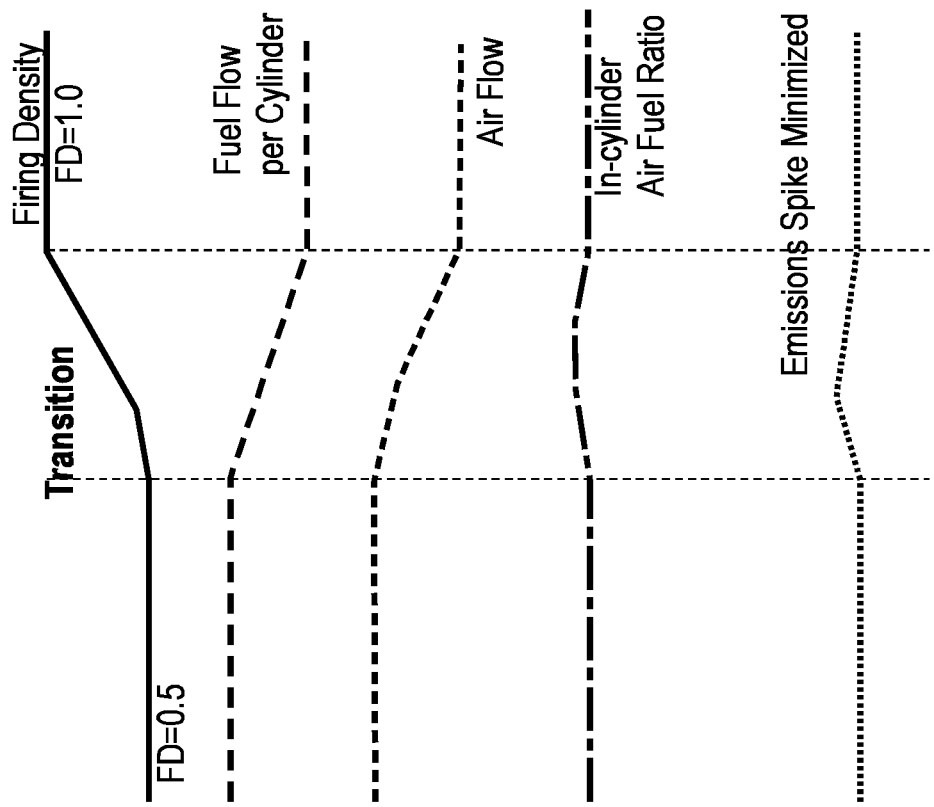
Figure 7B:
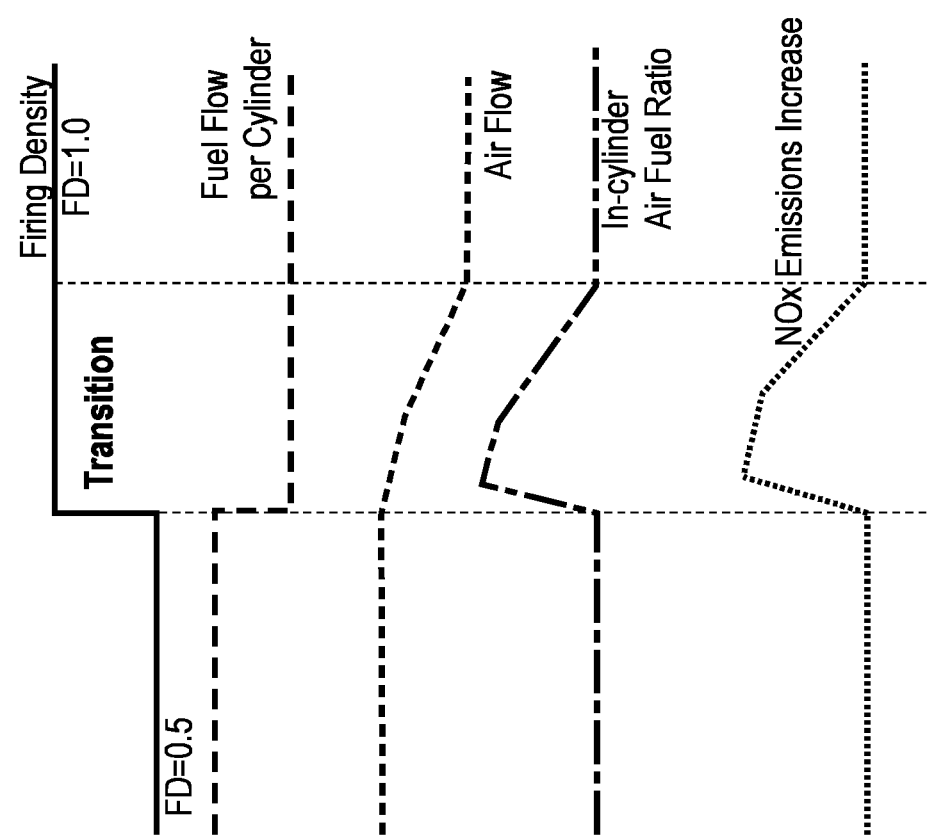

FIG. 7A-7C are various diagrams illustrating how a spike in $NO_x$, emissions by the exemplary internal combustion engine is mitigated during transitions from a low firing density to a high firing density. The mitigation of a spike in the $NO_x$ emissions is essentially the complement of that described above. When the engine 12 is operating at a relatively low firing density and transitions to a higher firing density (e.g., a transition from 0.5 to 1.0), a gradual transition using one or more intermediate firing densities (e.g., 0.6, 0.7, 0.8, 0.9) tends to reduce the spike in $NO_x$ emissions.

FIG. 7A is similar to FIG. 6A except that the engine 12 is initially at a low firing density of 0.5 and transitions to a high firing density of 1. FIG. 7B shows behavior of various engine parameters during an abrupt transition from the low to the high firing density. The transition causes the fuel flow to each fired cylinder to immediately transition down. The air intake, however, gradually transitions lower due to lag. As a result, the air-fuel ratio in the fired chambers spikes, causing a corresponding spike in the $NO_x$ emissions. In contrast as shown in FIG. 7C, a controlled, gradual, transition reduces or eliminates altogether the spike in the air-fuel ratio and the resulting spike in the $NO_x$ emissions.

Controlling Firing Density to Modulate Exhaust Temperature

The skip fire controller 58 can be used to modulate the temperature of the exhaust gas in several ways. First, by either skipping or firing cylinders 16, the temperature can be controlled. Second, with skipped cylinders, either pumping air thru the cylinder or deactivating the cylinder by closing one or both of the intake or exhaust valve(s) so that no air is pumped thru the cylinder.

Different firing densities change the work load of the individual cylinders 16 of the engine 12. If many or all are fired, each cylinder 16 performs less work. If fewer are fired, each cylinder 16 performs more work. In general, the more work a given cylinder 16 performs, the higher the temperature of the exhaust gas from that cylinder.

As noted above with regard to the FIG. 2, the representative operating range for the reducing catalytic converter 26 may be in the approximate range of 200° to 400° C. By changing the firing density, it is therefore possible to modulate the temperature of the exhaust gases to substantially stay within the range of 200° to 400° C. range. By keeping within the ideal temperature range, the reducing catalytic converter 26 is more effective in reducing $NO_x$, emissions.

Consider an example of a six-cylinder engine with three active cylinders and three that are deactivated or skipped. Each active cylinder will receive an air-fuel ratio that is relatively rich. By activating a forth (or more) cylinder(s), the same amount of fuel is spread out among the four (or more) cylinders. As a result, the air-fuel ratio per cylinder becomes leaner. The leaner the air-fuel ratio, the cooler the resulting exhaust will be. Thus, by activating more cylinders, the temperature of the exhaust gases can be controlled and reduced. The complement of the above can also be used to increase the temperature of the exhaust gases if too cool. If five or six cylinders are operational and the exhaust is too cool, then one or several cylinders can be deactivated. By deactivating cylinders, the air-fuel ratio spread across the remaining active cylinders becomes richer. As a result, combustion yields hotter exhaust gases.

The skipping of a cylinder 16 can be implemented in one of two ways. First, either the intake or exhaust valves (or both) can be closed during a skipped firing opportunity. As a result, no air is pumped through the cylinder. Second, both the intake and the exhaust valves can be opened, but no fuel is provided to the cylinder during a skipped firing opportunity. As a result, air is pumped through the chamber, but there is no combustion. When air is pumped into the exhaust system, the effect is to reduce the temperature of the exhaust gases. Thus, by either allowing skipped cylinders to either pump or not pump air, the temperature of the exhaust gases can be further controlled or modulated.

Figure 8:
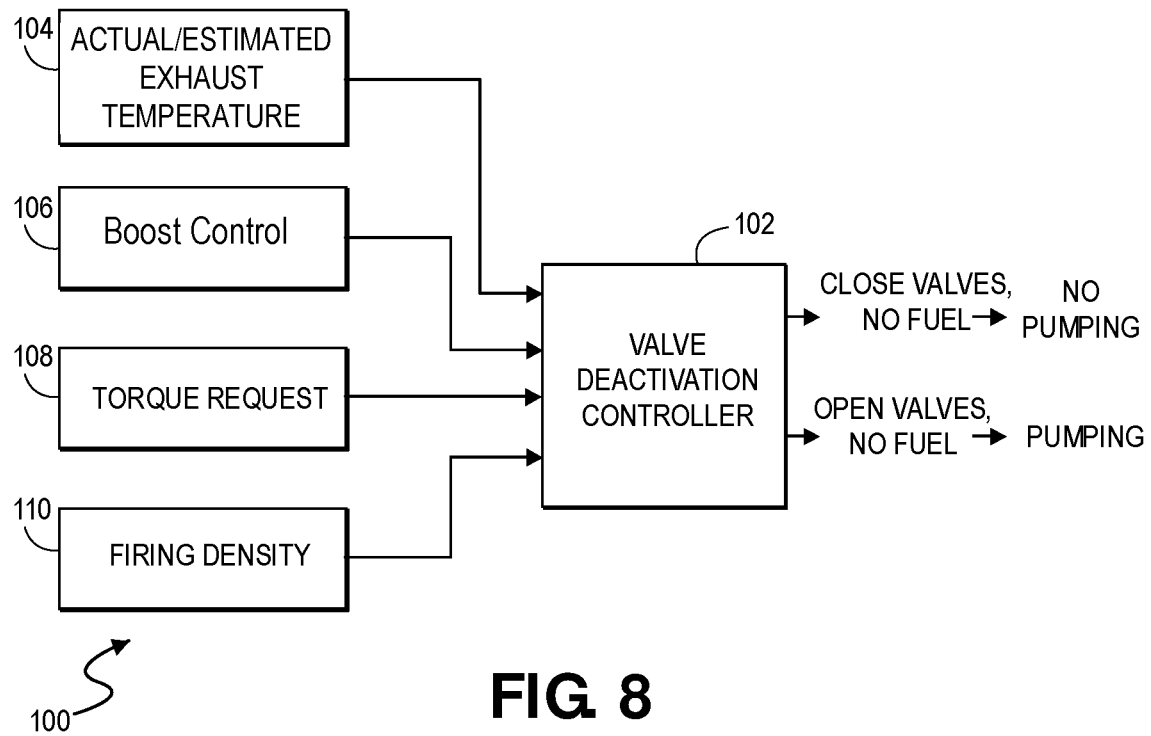
FIG. 8 is a schematic block diagram for a valve deactivation controller according to a non-exclusive embodiment of the present invention.

Referring to FIG. 8, a schematic block diagram for a valve deactivation controller 102 is shown. In various embodiments, the valve activation controller 102 may be included in or separate from the skip fire controller 58.

The valve deactivation controller 102 receives an input 104 indicative of the actual and/or an estimate of the exhaust temperature in the aftertreatment system 14A/14B, an input 106 indicative of the amount of compressed air that is forced into the cylinders 16 by the turbocharger 90 (or some other type of boost system), the current torque request 108, and an input 110 indicative of the firing density as determined by the skip fire controller 58. In response, the valve deactivation controller 102 makes a decision for the skipped cylinders 16 to either:

(1) prevent pumping by closing either the intake and/or exhaust valves of the skipped cylinder 16; or (2) allowing air to be pumped through the deactivated cylinder 16 by opening both the intake and exhaust valves. Since no fuel is provided to the cylinder 16, no combustion occurs, and intake air is pumped into the aftertreatment system 14A/14B.

Figure 9:
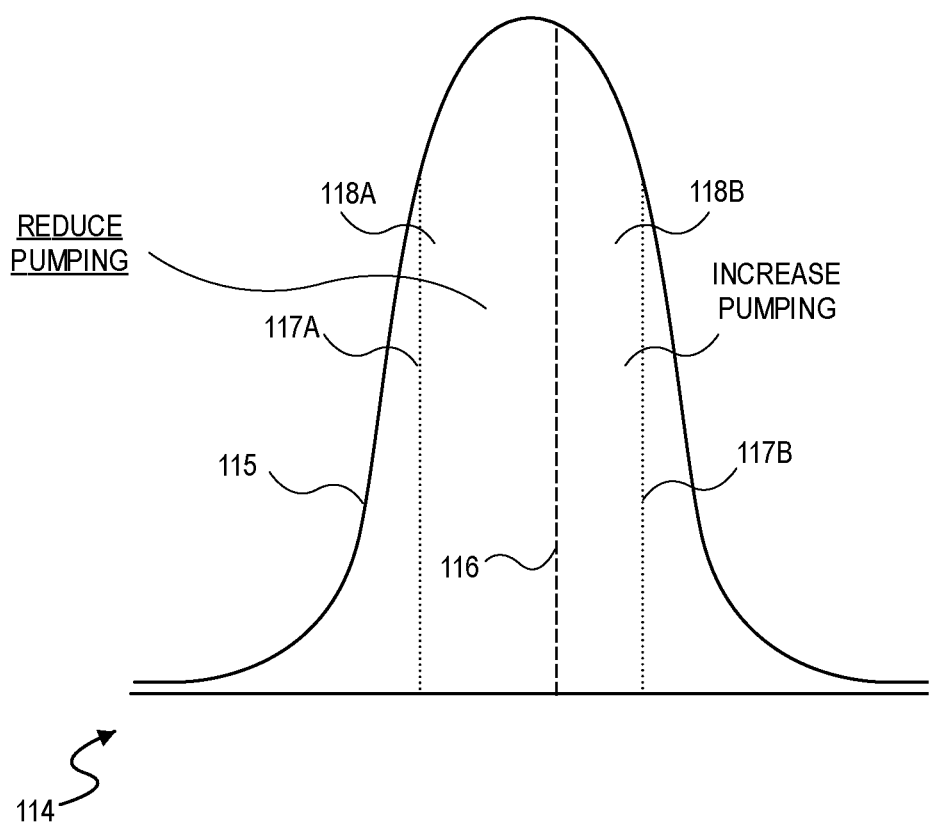
FIG. 9 is a diagram illustrating modulation of exhaust gas temperature by using cylinder deactivation during skip fire operation of the exemplary internal combustion engine according to a non-exclusive embodiment of the present invention.

FIG. 9 is a diagram 114 illustrating how the valve deactivation controller 102 may be used to modulate exhaust temperatures. Curve 115 represents efficiency of the reducing catalyst as a function of the reducing catalyst temperature. As noted, a representative operating range for the reducing catalyst 26 may be in the range of 200° to 400° C., which is defined by the region between dotted lines 117A and 117B. The line 116 represents a threshold temperature value below the maximum operating range of 400° C. The precise temperature value of the threshold 116 may vary, but in general, it represents a preferred or target operating temperature of the reducing catalytic converter 26. The threshold value may be offset towards the upper bound of the operating temperature range as shown in FIG. 9, since pumping air through the engine will rapidly reduce the catalyst temperature, whereas not pumping air has a more gradual impact on catalyst temperature. When the actual exhaust temperature 104 is in the region 118A (i.e., below the threshold 116), then the valve deactivation controller 102 operates to prevent pumping of skipped cylinders 16. As a result, the temperature in the aftertreatment system 14A/14B will be essentially maintained or prevented from decreasing. If the actual exhaust temperature 104 is in the region 118B (i.e., above the threshold 116), then the valve deactivation controller 102 operates to allow pumping of skipped cylinders 16. As a result, the temperature in the aftertreatment system 14A/14B will tend to decrease.

The ability to control or modulate the temperature of the exhaust gas can therefore be implemented by (1) firing or skipping cylinders and/or (2) by either allowing or preventing pumping on skipped cylinders. In alternative embodiments, just the cylinder firing/skipping can be used, or alternatively, both techniques can be cooperatively used.

Priorities

Most turbochargers rely on a contour efficiency map that specifies a high efficiency region defined by (a) a particular pressure range and (b) an air volume range. The contour efficiency map also defines a surge line that should not be exceeded. If the pressure exceeds the surge line, the chance of mechanical damage to the turbocharger and/or the engine increases significantly.

Cylinder deactivation tends to increase the MAC and pressure in the firing cylinders. With one or more deactivated cylinders, the intake air is shared among fewer active cylinders, causing an increase of pressure than if all the cylinders are active. As a result, cylinder deactivation may increase the chance that the surge line of the turbocharger is exceeded. A priority scheme that balances priority between the torque requests, exhaust temperature, and preventing a turbocharger from exceeding its surge line is therefore desirable.

Figure 10:
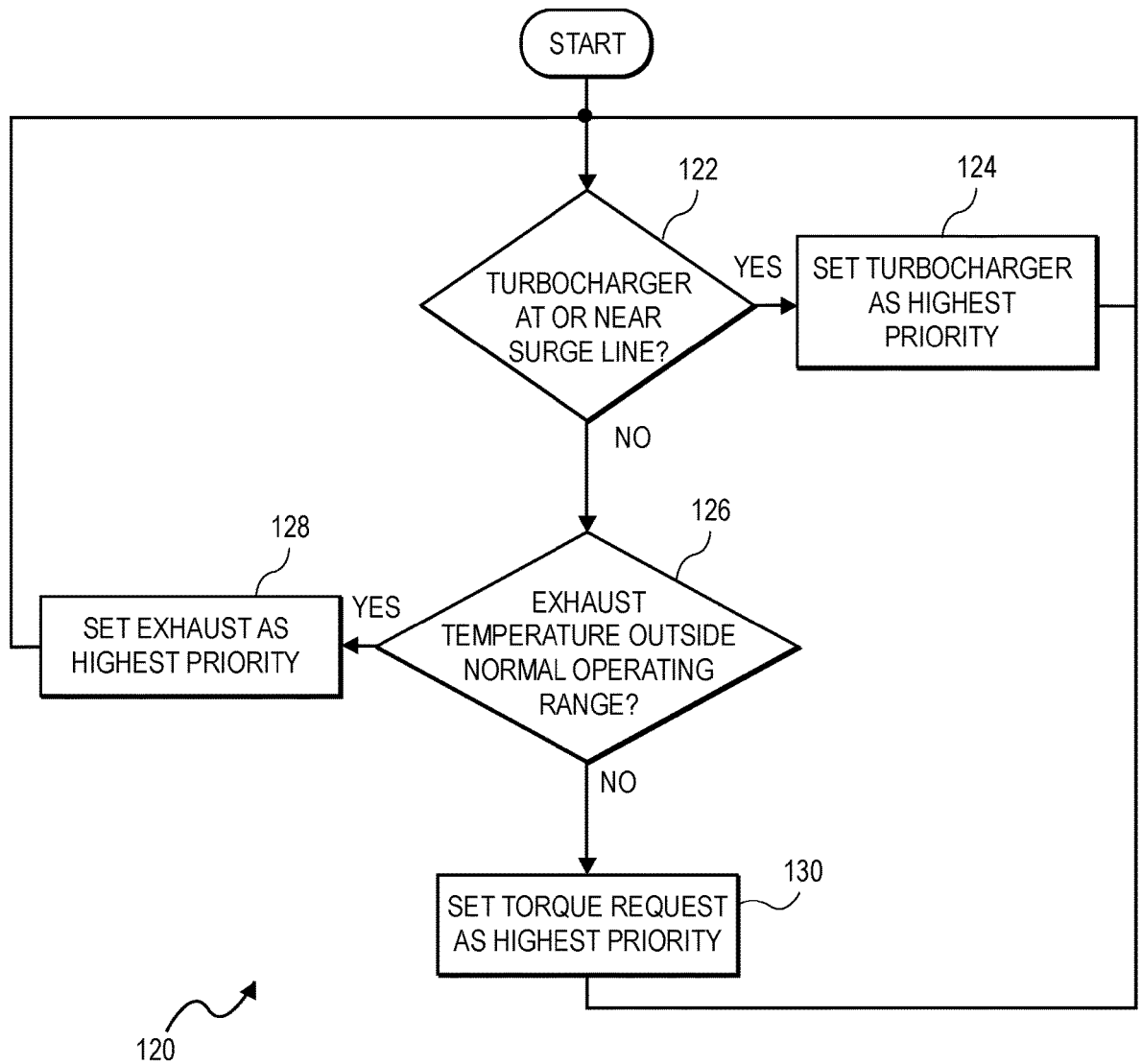
FIG. 10 is a logic flow diagram illustrating prioritization of inputs provided to the valve deactivation controller according to a non-exclusive embodiment of the present invention.

Referring to FIG. 10 a logic flow diagram 120 illustrating a prioritization scheme implemented by the skip fire controller 58 and/or the valve deactivation controller 102 is shown. The intent of the prioritization scheme is to continually monitor the exhaust temperature, the turbocharger operating conditions, and the current torque request and to set priorities on which should take precedent based on real-time operating conditions. Since the likelihood of turbocharger and/or engine damage increases dramatically if the surge line is exceeded, the turbocharger is preferably set as the highest priority. Second in priority is the exhaust gas temperature, which can damage the exhaust system if it exceeds an operational limit for an extended period of time or lead to unacceptable emissions if it is outside of its normal operating region. Third in priority is the desire to meet the requested engine torque.

The logic flow diagram starts and proceeds to decision step 122. In decision step 122 the turbocharger is continually monitored. If the turbocharger compressor is operating at or near the surge line, then the turbocharger is given the highest priority and the flow diagram proceeds to step 124.

In step 124, the skip fire controller 58 and/or the valve deactivation controller 102 operate so as to move the turbocharger operating point away from the surge line, so there is sufficient operating margin to avoid surge. Such action may include activating more cylinders, reducing the air intake, reducing the pressure generated by the turbocharger, reducing the EGR flow, reducing engine torque, etc.

On the other hand, if turbocharger is operating well away from the surge line, then the flow diagram proceeds to decision step 126. In decision step 126 it is determined if exhaust gases are operating outside of a predefined normal range (e.g., 200° to 400° C.).

If yes, then the exhaust temperature is set as the highest priority (step 128). The skip fire controller 58 and/or the valve deactivation controller 102 operate to adjust the exhaust temperature to within its normal range by activating or deactivating cylinders and/or reducing the engine torque.

If the exhaust gas temperature is within its normal operating range, then the current torque request is set as the priority (step 130). As a result, the firing density defined by the skip fire controller 58 is defined predominately to meet the current torque request. The air-fuel ratio can be controlled so that the engine generally operates in region 40 of FIG. 5, where engine generated pollutants are minimized.

During operation, the above decisions are continually made. As a result, the priority of the skip fire controller 58 and/or the valve deactivation controller 102 are continually updated to meet current operating conditions. As issues with the turbocharger and/or aftertreatment system occur, they are prioritized and corrected. When no issues are present, then meeting the current torque demand is the priority.

Alternative Embodiments

With certain embodiments of the skip fire controller 58, a decision to fire or not fire a given cylinder of an engine is made dynamically, meaning on a firing opportunity-by-firing opportunity basis. In other words, prior to the firing of each cylinder of an engine, a decision is made to either fire or skip the firing opportunity. Similarly, with certain embodiments of the valve deactivation controller 102, a decision to either allow or prevent pumping can be dynamically made on firing opportunity by firing opportunity basis.

The intake and exhaust valve control may be more complex than simple binary control, i.e. open or closed. Variable lift valves may be used and/or the valve opening/closing timing may be adjusted by a cam phaser. These actuators allow limited control of cylinder MAC without use of a throttle and its associated pumping losses. Advantageously adjustment of the cylinder MAC allows control of the air-fuel ratio for a fixed fuel charge. The combustion conditions may then be optimized for improved fuel efficiency or to provide other desired conditions, i.e. temperature, pollutant emission levels, etc., in the combustion exhaust gases.

The invention has been described primarily in the context of controlling the firing of 4-stroke, compression ignition, piston engines suitable for use in motor vehicles. The compression ignition may use a stratified fuel charge, a homogeneous fuel charge, a partial homogeneous charge, or some other type of fuel charge. However, it should be appreciated that the described skip fire approaches are very well suited for use in a wide variety of internal combustion engines, including gasoline and/or spark-ignition (SI) type engines. In addition, any of the engines described herein may be used for virtually any type of vehicle—including cars, trucks, locomotives, ships, boats, construction equipment, aircraft, motorcycles, scooters, etc.; and virtually any other application that involves the firing of cylinders and utilizes an internal combustion engine.

Although only a few embodiments have been described in detail, it should be appreciated that the present application may be implemented in many other forms without departing from the spirit or scope of the disclosure provided herein. Therefore, the present embodiments should be considered illustrative and not restrictive and is not to be limited to the details given herein but may be modified within the scope and equivalents of the appended claims.

What is claimed is:

1. An internal combustion engine having a plurality of cylinders, each of the cylinders arranged to combust an air-fuel mixture characterized by an air-fuel ratio, comprising:
   a skip fire controller arranged to operate the internal combustion engine in a skip fire mode by ascertaining a firing density to selectively operate the internal combustion engine at a reduced effective displacement, which is less than a full displacement of the internal combustion engine,
   the skip fire controller determining the firing density using a combination of:
   (a) a temperature of exhaust gases exhausted from the internal combustion engine;
   (b) the air-fuel ratio of the air-fuel mixture contained in one or more of the cylinders; and
   (c) a torque request,
   wherein, when operating at the ascertained firing density, at least one cylinder of the internal combustion engine is fired, skipped, and either selectively fired or skipped over successive firing opportunities; and
   a boost controller arranged to at least partially define an intake pressure for the plurality of cylinders, the boost controller arranged to define the intake pressure based at least partially on the firing density ascertained by the skip fire controller.

2. The internal combustion engine of claim 1, wherein the skip fire controller is further configured to dynamically ascertain different firing densities as (a), (b) and/or (c) change in response to changing driving conditions, wherein each of the different firing densities are indicative of different reduced effective displacements, all of which are less than the full displacement of the internal combustion engine.

3. The internal combustion engine of claim 1, wherein the skip fire controller is further configured to modulate the temperature of the exhaust gases passing through an aftertreatment system when the internal combustion engine is operating in the skip fire mode.

4. The internal combustion engine of claim 3, wherein the skip fire controller modulates the temperature of the exhaust gases passing through the aftertreatment system in the skip fire mode by pumping air through at least one skipped cylinder, the pumped air acting to reduce the temperature of the exhaust gases passing through the aftertreatment system.

5. The internal combustion engine of claim 4, wherein the air is pumped through the skipped cylinder by opening an intake and an exhaust valve, but not fueling, the skipped cylinder during a skipped firing opportunity.

6. The internal combustion engine of claim 3, wherein the skip fire controller modulates the temperature of the exhaust gases passing through the aftertreatment system in the skip fire mode by preventing pumping of air through at least one skipped cylinder, the lack of pumped air acting to prevent the temperature of the exhaust gases passing through the aftertreatment system from decreasing.

7. The internal combustion engine of claim 6, wherein the air is prevented from pumping through the at least one skipped cylinder by:
   (d) closing an intake valve;
   (e) closing an exhaust valve; or
   (f) both (d) and (e).

8. The internal combustion engine of claim 3, wherein the skip fire controller is further configured to modulate the exhaust gases within a temperature range.

9. The internal combustion engine of claim 8, wherein the temperature range is from approximately 200° C. to approximately 400° C.

10. The internal combustion engine of claim 8, wherein the skip fire controller is further configured to modulate the exhaust gases within the temperature range by:
    (a) allowing or increasing pumping air through the internal combustion engine when the exhaust gases are above a threshold temperature within the temperature range; and
    (b) preventing or reducing pumping air through the internal combustion engine when the exhaust gases are below the threshold temperature within the temperature range.

11. The internal combustion engine of claim 8, wherein the aftertreatment system is arranged to reduce nitrogen oxide ($NO_x$) emissions.

12. The internal combustion engine of claim 1, wherein the skip fire controller is further configured to operate the internal combustion engine in the skip fire mode by:
    (d) operating the internal combustion engine at a relatively high firing density;
    (e) targeting the internal combustion engine to operate at a relatively low firing density in response to a change in the torque request; and
    (f) gradually transitioning operation of the internal combustion engine from the relatively high firing density to the relatively low firing density using one or more intermediate firing densities, the gradual transition mitigating a spike in particulate emissions by the internal combustion engine.

13. The internal combustion engine of claim 12, wherein the valve deactivation control unit makes a decision to selectively open or close the intake and/or exhaust valves associated with the select cylinder based at least partially on intake pressure generated by a boost system.

14. The internal combustion engine of claim 12, wherein the valve deactivation control unit makes a decision to selectively open or close the intake and/or exhaust valves associated with the select cylinder based at least partially on an actual or estimated temperature of the exhaust gases.

15. The internal combustion engine of claim 1, wherein the skip fire controller is further configured to operate the internal combustion engine in the skip fire mode by:
   (d) operating the internal combustion engine at a relatively low firing density;
   (e) targeting the internal combustion engine to operate at a relatively high firing density in response to a change in the requested torque demand; and
   (f) gradually transitioning operation of the internal combustion engine from the relatively low firing density to the relatively high firing density using one or more intermediate firing densities, the gradual transition mitigating a spike in $NO_x$ emissions by the internal combustion engine.

16. The internal combustion engine of claim 1, further comprising a valve deactivation control unit for selectively opening or closing an intake valve and/or an exhaust valve associated with a select cylinder of the plurality of cylinders of the internal combustion engine respectively, wherein the valve deactivation control unit acts to selectively open or close the intake valve and/or the exhaust valve for the select cylinder during a skipped firing opportunity based on if pumping air into the exhaust system is desired or not.

17. The internal combustion engine of claim 1, further comprising a valve deactivation control unit arranged to selectively open or close the intake and/or exhaust valves associated with the plurality of cylinders of the internal combustion engine respectively, the selective opening or closing based on a prioritization scheme, the prioritization scheme defining a priority order, including:
   (1) a turbocharger operating at or near a surge condition; and
   (2) an actual or estimated temperature of the exhaust gases outside a normal operating range; and
   (3) a current torque request.

18. The internal combustion engine of claim 17, wherein the valve deactivation control unit is further arranged to prioritize the selective opening of the intake and exhaust valves associated with one or more of the plurality of cylinders based on if a compressor is operating at or near the surge condition.

19. The internal combustion engine of claim 17, wherein the valve deactivation control unit is further arranged to prioritize the selective opening or closing of the intake and/or exhaust valves associated with one or more of the plurality of cylinders based on the actual or estimated temperature of the exhaust gases being either too hot or too cold with respect to the normal temperature range which is defined as suitable for reducing $NO_x$ emissions,
   wherein the intake and the exhaust valves associated with the one or more cylinders are opened to induce pumping when the temperature is too hot;
   wherein the intake and/or the exhaust valves associated with the one or more cylinders are closed to prevent pumping when the temperature is too cold.

20. The internal combustion engine of claim 1, wherein the internal combustion engine is one of the following:
   (d) a compression-ignition engine;
   (e) a spark ignition engine;
   (f) a lean-burn engine;
   (g) a Diesel engine; or
   (h) a gasoline engine.

21. The internal combustion engine of claim 1, further comprising an aftertreatment system for treating the exhaust gases exhausted from the internal combustion engine, the aftertreatment system including:
   (e) a particulate filter;
   (f) an oxidizing catalytic converter;
   (g) a reducing catalytic converter; or
   (h) any combination of (e) through (g).

22. The internal combustion engine of claim 1, wherein the skip fire controller is a dynamic skip fire controller arranged to dynamically make a decision to fire or skip the at least one cylinder on a firing opportunity-by-firing opportunity basis.

23. The internal combustion engine of claim 1, wherein the air-fuel ratio in a cylinder of the plurality cylinders is adjusted based on a firing history of the cylinder.

24. The internal combustion engine of claim 23, wherein a timing of fuel injection or a pattern of fuel injection is adjusted based on the firing history of the cylinder.

25. The internal combustion engine of claim 1, wherein the air-fuel ratio in a cylinder of the plurality cylinders is adjusted based an engine skip-fire sequence preceding firing the cylinder.

26. The internal combustion engine of claim 25, wherein a timing of fuel injection or a pattern of fuel injection is adjusted based on the engine skip-fire sequence preceding firing the cylinder.

27. An internal combustion engine having a plurality of cylinders, each of the cylinders arranged to combust an air-fuel mixture characterized by an air-fuel ratio, comprising:
   a skip fire controller arranged to operate the internal combustion engine in a skip fire mode by ascertaining a firing density to selectively operate the internal combustion engine at a reduced effective displacement, which is less than a full displacement of the internal combustion engine,
   the skip tire controller determining the firing density using a combination of:
   (a) a temperature of exhaust gases exhausted from the internal combustion engine;
   (b) the aft-fuel ratio of the air-fuel mixture contained in one or more of the cylinders; and
   (c) a torque request,
   wherein, when operating at the ascertained firing density, at least one cylinder of the internal combustion engine is fired, skipped, and either selectively fired or skipped over successive firing opportunities; and
   an Exhaust Gas Recirculation (EGR) controller arranged to at least partially define the amount of exhaust gases to be recirculated into at least one of the plurality of cylinders based on the combination of (a), (b) and (c).

28. The internal combustion engine of claim 27, wherein the skip fire controller is further configured to dynamically ascertain different firing densities as (a), (b) and/or (c) change in response to changing driving conditions, wherein each of the different firing densities are indicative of different reduced effective displacements, all of which are less than the full displacement of the internal combustion engine.

29. The internal combustion engine of claim 27, wherein the skip fire controller is further configured to modulate the temperature of the exhaust gases passing through an aftertreatment system when the internal combustion engine is operating in the skip fire mode.

30. The internal combustion engine of claim 29, wherein the skip fire controller modulates the temperature of the exhaust gases passing through the aftertreatment system in the skip fire mode by pumping air through at least one skipped cylinder, the pumped air acting to reduce the temperature of the exhaust gases passing through the aftertreatment system.

31. The internal combustion engine of claim 29, wherein the skip fire controller modulates the temperature of the exhaust gases passing through the aftertreatment system in the skip fire mode by preventing pumping of air through at least one skipped cylinder, the lack of pumped air acting to prevent the temperature of the exhaust gases passing through the aftertreatment system from decreasing.

32. The internal combustion engine of claim 29, wherein the skip fire controller is further configured to modulate the exhaust gases within a temperature range of approximately 200° C. to approximately 400° C.

33. The internal combustion engine of claim 29, wherein the skip fire controller is further configured to modulate the exhaust gases by:
  (a) allowing or increasing pumping air through the internal combustion engine when the exhaust gases are above a threshold temperature within the temperature range; and
  (b) preventing or reducing pumping air through the internal combustion engine when the exhaust gases are below the threshold temperature within the temperature range.

34. The internal combustion engine of claim 27, wherein the skip fire controller is further configured to operate the internal combustion engine in the skip fire mode by:
  (d) operating the internal combustion engine at a first firing density;
  (e) targeting the internal combustion engine to operate at a second firing density in response to a change in the requested torque demand; and
  (f) gradually transitioning operation of the internal combustion engine from the first firing density to the second firing density using one or more intermediate firing densities, the gradual transition mitigating a spike in pollution emissions by the internal combustion engine.

35. The internal combustion engine of claim 27, further comprising a valve deactivation control unit arranged to selectively open or close the intake and/or exhaust valves associated with the plurality of cylinders of the internal combustion engine respectively, the selective opening or closing based on a prioritization scheme, the prioritization scheme defining a priority order, including:
  (1) a turbocharger operating at or near a surge condition; and
  (2) an actual or estimated temperature of the exhaust gases outside a normal operating range; and
  (3) a current torque request.

36. The internal combustion engine of claim 35, wherein the valve deactivation control unit is further arranged to prioritize the selective opening of the intake and exhaust valves associated with one or more of the plurality of cylinders based on if a compressor is operating at or near the surge condition.

37. The internal combustion engine of claim 35, wherein the valve deactivation control unit is further arranged to prioritize the selective opening or closing of the intake and/or exhaust valves associated with one or more of the plurality of cylinders based on the actual or estimated temperature of the exhaust gases being either too hot or too cold with respect to the normal temperature range which is defined as suitable for reducing $NO_x$ emissions,
  wherein the intake and the exhaust valves associated with the one or more cylinders are opened to induce pumping when the temperature is too hot;
  wherein the intake and/or the exhaust valves associated with the one or more cylinders are closed to prevent pumping when the temperature is too cold.

38. The internal combustion engine of claim 27, wherein the skip fire controller is a dynamic skip fire controller arranged to dynamically make a decision to fire or skip the at least one cylinder on a firing opportunity-by-firing opportunity basis.

39. The internal combustion engine of claim 27, wherein the air-fuel ratio in a cylinder of the plurality cylinders is adjusted based on a firing history of the cylinder.

40. The internal combustion engine of claim 27, wherein a timing of fuel injection or a pattern of fuel injection is adjusted based on the firing history of the cylinder.

41. The internal combustion engine of claim 27, wherein the fuel injection timing and the air-fuel ratio in a cylinder of the plurality cylinders is adjusted based an engine skip-fire sequence preceding firing the cylinder.

\* \* \* \* \*